US012656116B1

(12) United States Patent
Toutov et al.

(10) Patent No.: US 12,656,116 B1
(45) Date of Patent: Jun. 16, 2026

(54) DYNAMIC SELECTION OF PARAMETERS FOR NAVIGATION

(71) Applicant: Astra Navigation, Inc., The Woodlands, TX (US)

(72) Inventors: Anton Toutov, Magnolia, TX (US); Alexandre Toutov, Inverary (CA); Michael Quinsey, Montreal (CA); Joseph Quinsey, Windsor (CA)

(73) Assignee: Astra Navigation, Inc., The Woodlands, TX (US)

( * ) Notice: Subject to any disclaimer, the term of this patent is extended or adjusted under 35 U.S.C. 154(b) by 0 days.

(21) Appl. No.: 19/449,199

(22) Filed: Jan. 14, 2026

(51) Int. Cl.
*G01C 17/28* (2006.01)
*G01C 25/00* (2006.01)
(52) U.S. Cl.
CPC ............. *G01C 17/28* (2013.01); *G01C 25/00* (2013.01)
(58) Field of Classification Search
CPC ...................................................... G01C 17/28
USPC ........................................................... 33/361
See application file for complete search history.

(56) References Cited

U.S. PATENT DOCUMENTS

| | | | | |
|---|---|---|---|---|
| 9,167,440 | B2 * | 10/2015 | Kim ................... | G01C 21/1654 |
| 9,816,817 | B2 * | 11/2017 | Kim ....................... | G01C 21/08 |
| 10,883,830 | B2 * | 1/2021 | Boka ................... | G01C 21/1654 |
| 11,680,802 | B2 * | 6/2023 | Toutov .............. | G01C 21/3859 |
| | | | | 701/449 |

| | | | | |
|---|---|---|---|---|
| 11,801,003 | B2 * | 10/2023 | Shapiro ................ | A61B 5/6803 |
| 12,196,873 | B1 * | 1/2025 | Pratt ....................... | G01C 21/38 |
| 12,474,168 | B2 * | 11/2025 | Toutov .................. | G01C 21/08 |
| 12,498,245 | B2 * | 12/2025 | Toutov .................. | G01C 21/08 |
| 2021/0342372 | A1 * | 11/2021 | Simonson ......... | G06F 16/24573 |
| 2025/0000416 | A1 * | 1/2025 | Iwata ..................... | A61B 5/243 |

FOREIGN PATENT DOCUMENTS

| | | | |
|---|---|---|---|
| CN | 101867868 A | 10/2010 | |
| EP | 2602590 A1 * | 6/2013 | ............... G01V 3/08 |

(Continued)

OTHER PUBLICATIONS

"How to Calibrate a Magnetometer?"; Feb. 23, 2018.

(Continued)

*Primary Examiner* — George B Bennett

(57) ABSTRACT

In one embodiment, a method includes accessing a magnetic-field map of a region comprising data that represents magnetic-field values that correspond to locations in the region. The method includes accessing a sample magnetic recording comprising data that represents a time or distance series of magnetic measurements made along a path in the region. The method includes at least approximately aligning the sample magnetic recording to the magnetic-field map. Based on the alignment, the method includes generating a first set of parameters for aligning subsequent magnetic recordings to the magnetic-field map across a substantial entirety of the magnetic-field map, and generating one or more second sets of parameters for aligning subsequent magnetic recordings in one or more subdivisions of the magnetic-field map. The method also includes associating the first and second sets of parameters with the magnetic-field map and providing the magnetic-field map with the associated parameters for subsequent navigation.

22 Claims, 12 Drawing Sheets

(56) References Cited

FOREIGN PATENT DOCUMENTS

KR        20180072914 A    7/2018
WO        2021067140 A1    4/2021

OTHER PUBLICATIONS

"Magnetometer Calibration"; SensorConnect, Mar. 2025.
"Magnetometer Calibration"; sensors - Magnetometer Calibration - Robotics Stack Exchange; Nov. 5, 2018.
"Spherical Magnetometer Representation"; Magnetometer, Feb. 2025.
A. Vitali, "Ellipsoid or sphere fitting for sensor calibration"; DT0059 Design tip; STlife.augmented; Oct. 2018, 8 pp.
Angelis, et al., An Experimental System for Tightly Coupled Integration of GPS and AC Magnetic Positioning, IEEE Transactions on Instrumentation and Measurement, vol. 65, No. 5, pp. 1232-1241, May 2016.
Ashraf, et al., Floor Identification Using Magnetic Field Data with Smartphone Sensors, www.mdpi.com/journal/ sensors, Jun. 3, 2019.
C. Huang, Y. Chang, Y. Tan, M. Tsai, K. Chiang, "An Integrated Indoor Positioning Algorithm For Smartphone Using Pedestrian Dead Reckoning With Magnetic Fingerprint Aided"; The International Archives of the Photogrammetry, Remote Sensing and Spatial Information Sciences, vol. XLIII-B1-2022 Xxiv Isprs Congress (2022 Edition), Jun. 6-11, 2022, Nice, France.
C. Yang, P, Chen, T. Wen, G. Eu Jan, "IMU Consensus Exception Detection with Dynamic Time Warping-A Comparative Approach"; MDPI, Sensors 2019, 19, 2337; doi: 10.3390/s19102237.
Canciani, et al., Absolute Positioning Using The Earth's Magnetic Anomaly Field, Air Force Institute of Technology, Sep. 2016.
Canciani, et al., Magnetic Navigation, Air Force Institute of Technology.
Chen, et al., Quantum Physicists Found a New, Safer Way to Navigate, https://www.wired.com/story/quantum-physicists-found-a-new-safer-way-to-navigate/, Nov. 1, 2018.
Chulliat, A., W. Brown, P. Alken, C. Beggan, M. Nair, G. Cox, A. Woods, S. Macmillan, B. Meyer and M. Paniccia, 2020. "The US/UK World Magnetic Model for 2020-2025: Technical Report"; National Centers for Environmental Information, NOAA, doi: 10.25923/ytk1-yx35.
D. Bagnell, "Particle Filters: The Good, The Bad, The Ugly"; Statistical Techniques in Robotics (16-831, F11) Lecture#04 (Monday Sep. 12); Accessed Dec. 29, 2025.
Dgrat, "3D Magnetometer calibration algorithm"; Robotics Stack Exchange; Feb. 19, 2025.
E. Keogh, M. Pazzani, "Derivative Dynamic Time Warping".
F. Dallaert, D. Fox, W. Burgard, S. Thrun, "Monte Carlo Localization for Mobile Robots"; 1999.
G. Ouyang, K. Abed-Meraim, "Analysis of Magnetic Field Measurements for Indoor Positioning"; MDPI, Sensors 2022, 22, 4014.
H. Sakoe, S. Chiba, "Dynamic Programming Algorithm Optimization for Spoken Word Recognition"; IEEE Transactions on Acoustics, Speech, and Signal Processing, vol. ASSP-26, No. 1, Feb. 1978.
Hernandez, et al., Steering Control of Automated Vehicles Using Absolute Positioning GPS and Magnetic Markers, IEEE Transactions On Vehicular Technology, vol. 52, No. 1, pp. 150-161, Jan. 2003.
Indooratlas, et al., Last meter accuracy through technology fusion, https://www.indooratlas.com/positioning- technology/, 2021.
J. Chen, G. Ou, A. Peng, L. Zheng, J. Shi, "A Hybrid Dead Reckon System Based on 3-Dimensional Dynamic Time Warping"; MDPI, Electronics 2019, 8,185.
J. Chen, S.Song, Y, Gong, S. Zhang, "An indoor fusion navigation algorithm using HV-derivative dynamic time warping and the chicken particle filter"; Satellite Navigation (2022) 3:13.
K. Smalling, K. Eure, "A Short Tutorial on Inertial Navigation System and Global Positioning System Integration"; NASA, Sep. 2015, NASA/TM-2015-218803.

Kim, et al., Indoor positioning system using geomagnetic anomalies for smartphones, International Conference on Indoor Positioning and Indoor Navigation, Nov. 2012.
Kim, et al., Indoor Positioning System Using Magnetic Field Map Navigation and an Encoder System, www.mdpi.com/ journal/ sensors, Mar. 22, 2017.
L. Luft, W. Burgard, "Lecture 04: particle filters + Kalman filters"; Katie DC, Jan. 30, 2020, Notes from Probabilistic Robotics Ch. 3.
Lee, et al., Aerial Simultaneous Localization And Mapping Using Earth's Magnetic Anomaly Field, Air Force Institute of Technology, Mar. 21, 2019.
Li, et al., How feasible is the use of magnetic field alone for indoor positioning, International Conference on Indoor Positioning and Indoor Navigation, Nov. 2012.
Liu, et al., Fusion of Magnetic and Visual Sensors for Indoor Localization: Infrastructure-Free and More Effective, IEEE Transactions On Multimedia, vol. 19, No. 4, pp. 874-888, Apr. 2017.
Lohmann, et al., Magnetic maps in animals: nature's GPS, The Journal of Experimental Biology 210, pp. 3697-3705, Jul. 2007.
M. Wang, et al., "Automatic Calibration of Magnetic Tracking"; Shanghai Jiao Tong University, University of Michigan, 2022.
Noaa, et al., The World Magnetic Model - Uses, https://www.ngdc.noaa.gov/geomag/WMM/uses.shtml, Feb. 2020.
Prigge, et al., Signal Architecture for a Distributed Magnetic Local Positioning System, IEEE Sensors Journal, vol. 4, No. 6, pp. 864-873, Dec. 2004.
Riehle, et al., Indoor Waypoint Navigation via Magnetic Anomalies, IEEE Engineering in Medicine and Biology Society. Conference Aug. 2011.
S. Stachniss, J. Biswas and L. Parker, "COMPSCI-603: Robotics, Bayes Filters"; 2005.
S. Suvorova, J. Powell and A. Melatos, "Recontructing Gravitational Wave Core-Collapse Supernova Signals with Dynamic Time Warping"; May 28, 2019.
S. Thrun, D. Fox, W. Burgard, F. Dellaert, "Robust Monte Carlo localization for mobile robots"; Elsevier; Artificial Intelligence 128 (2001) 99-141.
Shockley, et al., Ground Vehicle Navigation Using Magnetic Field Variation, Air Force Institute of Technology, Sep. 2012.
Solin, et al., Modeling and Interpolation of the Ambient Magnetic Field by Gaussian Processes, Accepted To IEEE Transactions On Robotics, Mar. 21, 2018.
Sunqn, "Magnetometer Autocalibration"; Magentometer Autocalibration—Sensors—Arduino Forum; Feb. 28, 2021.
Sunqn, "Magnetometer Autocalibration"; Magnetometer Autocalibration—Other Hardware/Sensors—Arduino Forum; Feb. 2021.
T. Ozyagcliar, "Calibrating an eCompass in the Presence of Hard-and Soft-Iron Interference"; Freescale Semiconductor, Inc., Document No. AN4246, Rev. 4.0, Nov. 2015.
Teslabs Engineering, "A way to calibrate a magnetometer"; Feb. 19, 2025.
Vallivaara, et al., Simultaneous Localization And Mapping Using The Indoor Magnetic Field, University of Oulu Graduate School; University of Oulu, Faculty of Information Technology and Electrical Engineering Acta Univ. Oul. C 642, 2018.
Vectornav, "3.6 Magnetometer Hard & Soft Iron Calibration"; 2025.
W. Burgard, "Introduction to Mobile Robotics, Bayes Filter - Particle Filter and Monte Carlo Localization"; Uni Freiburg; Accessed Dec. 29, 2025.
X. Xie, K. Wong, H. Aghajan, P. Veelaert, W. Philips, "Inferring Directed Road Networks from GPS Traces by Track Alignment"; ISPRS Int. J. Geo-Inf. 2015, 4, 2446-2471; doi: 10.3390/ijgi4042446.
Y. Tawil, "Magnetometer Soft Iron and Hard Iron Calibration: Why and How"; Adadiat; Dec. 15, 2022.
Z. Deng, X. Fu, Q. Cheng, L. Shi, W. Liu, "CC-DTW: An Accurate Indoor Fingerprinting Localization Using Calibrated Channel State Information and Modified Dynamic Time Warping"; MDPI, Sensors 2019, 19, 1984; doi: 10.3390/s19091984.

* cited by examiner

North

302g

304g

306h

302i

304i

302h

306i

302i

302i

302h

500

304h

North

306g

302g

DYNAMIC SELECTION OF PARAMETERS FOR NAVIGATION

TECHNICAL FIELD

This disclosure generally relates to the use of magnetic sensors.

BACKGROUND

Earth's geomagnetic field (GMF) is a continuous potential field that is locally unique due to its physical nature and the influence of surrounding objects (e.g. buildings, magnetic materials, pillars, etc.). The GMF is stable, and changes in it over time are predictable and well documented. Magnetic anomalies can lead to local anomalies in the GMF. As a result, the GMF is a source of specific data that can be recorded, processed, and analyzed.

A fusion filter is an algorithm used in sensor fusion to combine data from multiple sensors, resulting in a more accurate estimate of a system being measured. A fusion filter combines data from multiple sensors measuring the same variable(s), such as position or orientation, and applies statistical processes to that data to estimate the most likely value of the variable(s). This reduces error and uncertainty and improves the accuracy and reliability of the system. An advantage of a fusion filter is its ability to handle noisy or unreliable sensor data. By combining data from multiple sources, a fusion filter reduces the impact of individual sensors' errors or biases.

More accurate input to a fusion filter (including, for example, more accurate magnetic-sensor data, motion data, rotation data, or other sensor data) facilitates more accurate output by the fusion filter. In most cases, raw sensor data require processing and adjustment or other calibration to provide accuracy, precision, or reliability. With a magnetic sensor, filtering and calibration are important. Even a well calibrated magnetic sensor may be affected by temperature variations or local magnetic disturbances that may render the magnetic sensor effectively unusable.

DESCRIPTION OF EXAMPLE EMBODIMENTS

Figure 1:
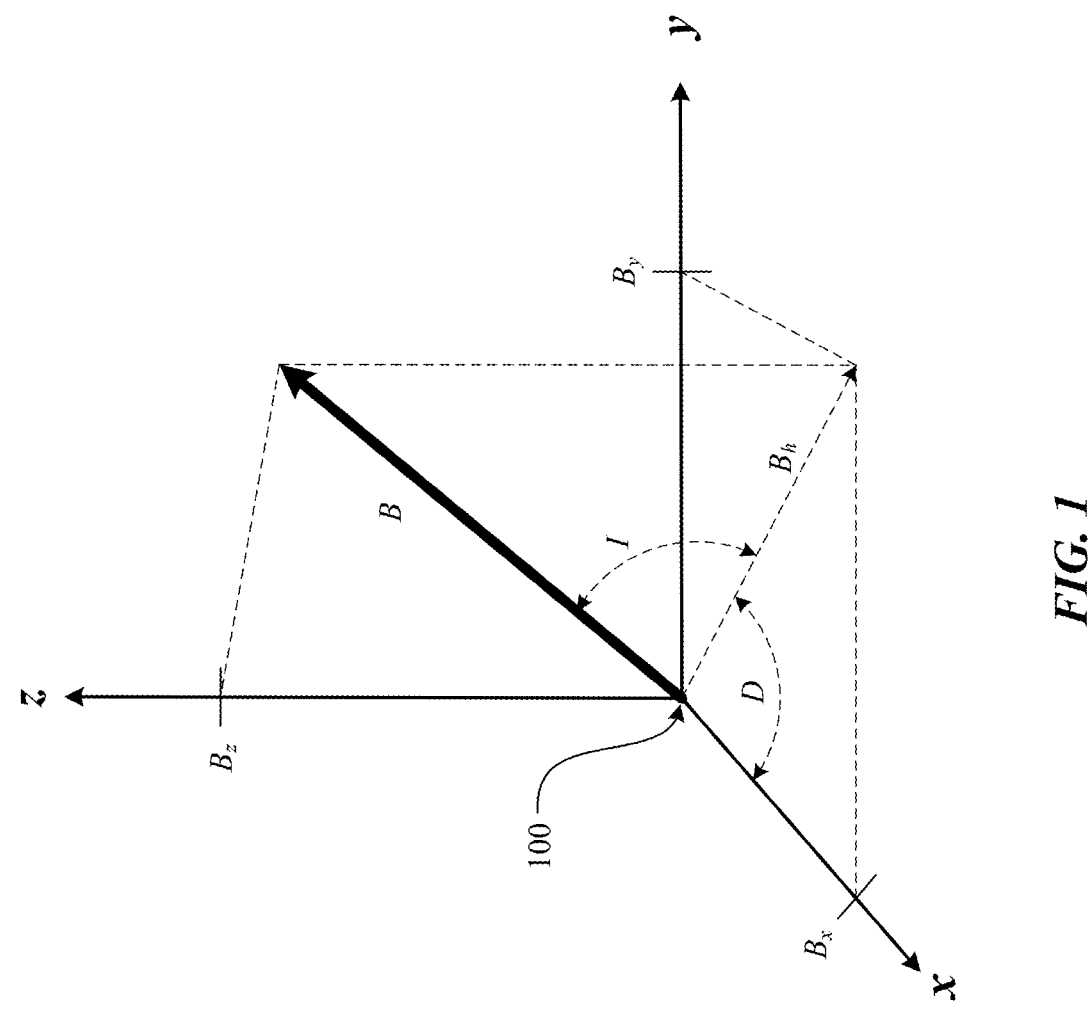
FIG. 1 illustrates example measurements of an example magnetic field at an example point in space.

A magnetic sensor measures one or more values of the magnetic field around it. In particular embodiments, a magnetic sensor is a three-dimensional-vector sensor and not a scalar sensor. Herein, reference to a magnetic sensor may include a magnetometer, and vice versa, where appropriate. Moreover, reference herein to a magnetic sensor may include one or more magnetic sensors, where appropriate. Raw measurements by a magnetic sensor may be inaccurate, imprecise, or unreliable and, as a result, provide inaccurate, imprecise, or unreliable readings. This may be a result of issues with the magnetic sensor (such as sensor bias, scale-factor errors, axis misalignments, hard-iron bias, or soft-iron distortion), environmental factors (such as temperature changes, electromagnetic interference, or magnetic anomalies), or both. Hard-iron bias may be caused by objects that produce their own magnetic fields, such as permanent magnets or magnetized metal, in the vicinity of the magnetic sensor. Soft-iron distortion may be caused by magnetic materials that are not permanently magnetized but distort external magnetic fields, bending or redirecting magnetic-field lines around them.

To address these problems with its raw measurements, the magnetic sensor may be calibrated (or compensated). Calibration (or compensation) of the magnetic sensor may include determining one or more adjustments to raw measurements by the magnetic sensor that will produce calibrated measurements that are more accurate, precise, or reliable than the raw measurements. For example, calibration of the magnetic sensor may identify and reduce or remove offsets in its raw measurements, reshape its raw measurements into a sphere or other suitable shape, or scale and align the axes of the magnetic sensor. Calibration of the magnetic sensor may also include applying the adjustments to raw measurements by the magnetic sensor to produce calibrated (or compensated) measurements. In particular embodiments, the adjustments may be applied by the magnetic sensor, a device that contains the magnetic sensor, another device that does not contain the magnetic sensor, or a combination of the preceding. As calibrated measurements may be more accurate, precise, or reliable than raw measurements, they may be used to provide more accurate readings than raw measurements. For example, those readings may be used to more accurately, precisely, or reliably determine a device's heading or orientation or to more accurately navigate or determine location with the device. Although particular calibration of a magnetic sensor is described or illustrated herein, this disclosure contemplates any suitable calibration of a magnetic sensor. Similarly, although particular uses of particular calibrated magnetic-sensor data are described or illustrated herein, this disclosure contemplates any suitable uses of any suitable calibrated magnetic-sensor data.

A raw measurement by a magnetic sensor may be one or more magnetic-field values measured by the magnetic sensor (or calculated or derived from one or more measured magnetic-field values) without calibration or before calibration is applied to it. In addition or as an alternative, a raw measurement may be a calibrated measurement that is to be used for additional calibration. Moreover, a raw measurement may include one or more raw measurements. A calibrated measurement by a magnetic sensor may be one or more magnetic-field values measured by the magnetic sensor (or calculated or derived from one or more measured magnetic-field values) with calibration or after calibration is applied to it (or with additional calibration or after additional calibration is applied to it) and may include one or more calibrated measurements. In addition or as an alternative, a calibrated measurement may be used as a raw measurement for calibration or recalibration. Herein, reference to calibrated data or calibrated magnetic-sensor data from one or more magnetic sensors may include one or more calibrated measurements by the magnetic sensors, and vice versa, where appropriate. Similarly, reference herein to raw data or raw magnetic-sensor data from one or more magnetic sensors may include one or more raw measurements by the magnetic sensors, and vice versa, where appropriate. Moreover, reference herein to calibration data (or data to be used for calibration) may include raw data, calibrated data, or both, and vice versa, where appropriate.

As described more fully below, particular embodiments facilitate optimizing calibration coefficients for more accurate, precise, or reliable calibration of a magnetic sensor. This may in turn facilitate generating more accurate, precise, or reliable heading, orientation, or other location information about a device and various applications or uses of that information, including calibration of an electronic compass. Particular embodiments facilitate self calibration of a magnetic sensor, which may be particularly advantageous in environments with high electromagnetic interference (EMI). This may also be advantageous when the local or environmental conditions in which navigation is being performed change. Particular embodiments facilitate validation of geolocation information (such as, e.g., an Internet Protocol (IP) address or other IP information or Global Navigation Satellite System (GNSS) information). Particular embodiments facilitate dynamic selection of DTW or other parameters for navigation with a magnetic-field map. Particular embodiments facilitate sensor fusion with location information determined at least in part by aligning a magnetic recording to a magnetic-field map using a warping algorithm (such as, e.g., DTW, COW, DDTW, WDTW, soft-DTW, GAK, ERP, LCSS, TWED, or another suitable warping algorithm) or a filtering algorithm (such as particle filtering). The magnetic-field map may include one or more sets of parameters for the use of the warping or filtering algorithm with the magnetic-field map, and the sets of parameters may be generated prior to the magnetic-field map being used for navigation. If there are multiple sets of parameters in the magnetic-field map, then one of the sets of parameters for use in aligning a magnetic recording to the magnetic-field map may be dynamically selected in real time during navigation. That selection may be based on where in the magnetic-field map the magnetic recording is being aligned, a velocity along a trajectory represented by the magnetic recording, or any other suitable basis.

FIG. 1 illustrates example measurements of an example magnetic field at an example point 100 in space. Herein, reference to a magnetic field may include the GMF on the surface of Earth (e.g. on land or on water), the GMF under the surface of Earth (e.g. underground or under water), the GMF in Earth's atmosphere (e.g. at any suitable altitude), a magnetic field on or under the surface of or in the atmosphere (if any) of another celestial body, a magnetic field in outer space, or a magnetic field in or on a man-made building, structure, or object in or on any of the foregoing. Moreover, reference herein to measurement(s) of a magnetic field includes measurements of any suitable magnetic field(s). Although particular magnetic fields are described or illustrated herein, this disclosure contemplates any suitable magnetic field. A magnetic field may include one or more magnetic fields. In the example of FIG. 1, B is a vector representing in a three-dimensional coordinate frame the magnitude (or strength) and direction of the magnetic field at point 100. The coordinate frame may be a body-fixed coordinate frame relative to a device measuring the magnetic field, such as a magnetometer or a device containing the magnetometer. $B_x$ is the x component of the magnitude of the magnetic field (which may be the projection of the strength of the magnetic field along the x axis of the coordinate frame), $B_y$ is the y component of the magnitude of the magnetic field (which may be the projection of the strength of the magnetic field along the y axis of the coordinate frame), and $B_z$ is the z component of the magnitude of the magnetic field (which may be the projection of the strength of the magnetic field along the z axis of the coordinate frame). Reference herein to a value or values of a magnetic field (or one or more magnetic-field values) may, where appropriate, include the strength of the magnetic field; the inclination angle of the magnetic field; the declination angle of the magnetic field; magnetic susceptibility; magnetic conductivity; one or more individual components of the foregoing (such as, for example, $B_x$, $B_y$, or $B_z$); one or more derivatives of the foregoing; another property of the magnetic field; or a combination of the foregoing. A magnetic-field value may be determined by measurement, calculation, or both, where appropriate. Similarly, reference herein to measurement of a magnetic-field value (such as, e.g., a raw or calibrated measurement) may include calculation of the magnetic-field value, where appropriate. Bn is the magnitude of the projection of the vector of magnetic induction to a plane defined by the x and y axes of the coordinate frame, which may be a horizontal plane. D is the declination angle of the magnetic field relative to the coordinate frame, and I is the inclination angle of the magnetic field relative to the body-fixed coordinate frame. Inclination (or magnetic inclination) may be referred to as magnetic dip and may be the angle made with the horizontal by Earth's magnetic-field lines. If $B_x$, $B_y$, and $B_z$ are measured components of the magnetic-induction vector, for example, by a magnetometer, then with those values the following equations may be used to determine the magnitude of the magnetic-induction vector, $|B|$, the magnitude of the horizontal component of B, $|B_h|$, the declination angle of the magnetic field, D, and the inclination angle of the magnetic field, I:

$$|B| = \sqrt{B_x^2 + B_y^2 + B_z^2} \tag{1}$$

$$|B_h| = \sqrt{B_x^2 + B_y^2} \tag{2}$$

$$D = \cos^{-1}\left(\frac{B_x}{B_h}\right) \tag{3}$$

$$I = \sin^{-1}\left(\frac{B_z}{B}\right) \tag{4}$$

Although particular measurements of a particular magnetic field at a particular point in space are described or illustrated herein, this disclosure contemplates any suitable measurement of any suitable magnetic field at any suitable point in space. A magnetic recording may include any suitable time or distance series of any suitable magnetic measurements, e.g., made along a trajectory. The magnetic measurements in a magnetic recording may, but need not necessarily, be one or more of the magnetic measurements described or illustrated herein. Moreover, magnetic measurements (whether or not in a magnetic recording) may be direct magnetic measurements (e.g. $B_x$, $B_y$, or $B_z$) or calculated from direct magnetic measurements (e.g. B, $B_h$, D, I, $|B|$, or $|B_h|$). Reference herein to a magnetic recording may include data associated with the magnetic recording, the magnetic measurements and their corresponding points represented by the data, a symbolic or graphical representation of either or both of the foregoing, or a combination of the foregoing, and vice versa, where appropriate. A magnetic measurement may include on or more magnetic measurements. Herein, reference to one or more magnetic measurements may include one or magnetic-field values, and vice versa, where appropriate.

In particular embodiments, a magnetometer measures the direction, strength, or relative change of a magnetic field at a point in space. In particular embodiments, a magnetometer is a three-dimensional-vector sensor and not a scalar sensor. In particular embodiments, a magnetometer includes one or more magneto-resistive (MR) or other sensors. In addition or as an alternative, a magnetometer may include one or more superconducting quantum-interference device (SQUID) sensors; search-coil sensors; nuclear-precession sensors; optically pumped sensors; fiber-optic sensors; fluxgate sensors; magneto-inductive sensors; anisotropic magneto-resistive (AMR) sensors; bias magnet field sensors; reed switches; Hall sensors; integrated Hall sensors; giant magneto-resistive (GMR) sensors; unpinned sandwich GMR sensors; antiferromagnetic-multilayer sensors; spin-valve sensors; spin-dependent tunneling (SDT) sensors; colossal magneto-resistive (CMR) sensors; or other suitable sensors for measuring a magnetic field. Although particular magnetometers including particular numbers of particular sensors are described or illustrated herein, this disclosure contemplates any suitable magnetometers including any suitable numbers of any suitable sensors. Moreover, although magnetometers are described or illustrated herein as taking particular magnetic measurements, this disclosure is not limited to magnetometers and contemplates any suitable magnetic sensors taking any suitable magnetic measurements (such as, for example, measurements of magnetic-field strength, magnetic-field inclination angle, magnetic susceptibility, magnetic conductivity, or a combination of the foregoing).

A magnetometer may be contained in a semiconductor package (which may include, for example, a metal, glass, plastic, or ceramic casing). In particular embodiments, a magnetometer may be present alongside one or more Internet of Everything (IoT) sensors. In particular embodiments, a magnetometer may be used in conjunction with one or more other sensors, such as, for example, accelerometers, gyroscopes, light detection and ranging (LIDAR) sensors, pressure sensors, or temperature sensors. The semiconductor package containing the magnetometer may be mounted on a printed circuit board (PCB) along with one or more other components, which together may be referred to as an assembly (or module). The assembly may include an inter-integrated circuit ($I^2C$) interface for communicating with one or more other devices, such as for example one or more controllers via one or more switches. An example switch includes the TCA9548A $I^2C$ multiplexer made by ADAFRUIT INDUSTRIES. A TCA9548A $I^2C$ multiplexer can switch up to eight magnetometers over an $I^2C$ bus. A TCA9548A $I^2C$ multiplexer has its own 0x70 $I^2C$ address, which can be changed using three pins. In particular embodiments, this enables the microcontroller to communicate with up to 64 magnetometers. Herein, reference to a magnetometer may include both the magnetometer and the semiconductor package containing it, where appropriate. Example magnetometers include the HMC5983 three-axis digital-compass integrated circuit (IC) made by HONEYWELL, the HMC5883L three-axis digital-compass IC made by HONEYWELL, the QMC5883L three-axis magnetic sensor made by QST, and the AK8963 three-axis electronic compass made by ASAHI KASEI MICRODEVICES. Although particular magnetometers are described or illustrated herein, this disclosure contemplates any suitable magnetometers. Example assemblies (or modules) with magnetometers include a GY-271L electronic compass and a GY-273 compass module. Although particular assemblies (or modules) are described or illustrated herein, this disclosure contemplates any suitable assemblies (or modules). Herein, reference to a magnetometer may include both the magnetometer and the assembly it is mounted on, where appropriate.

Figure 2:
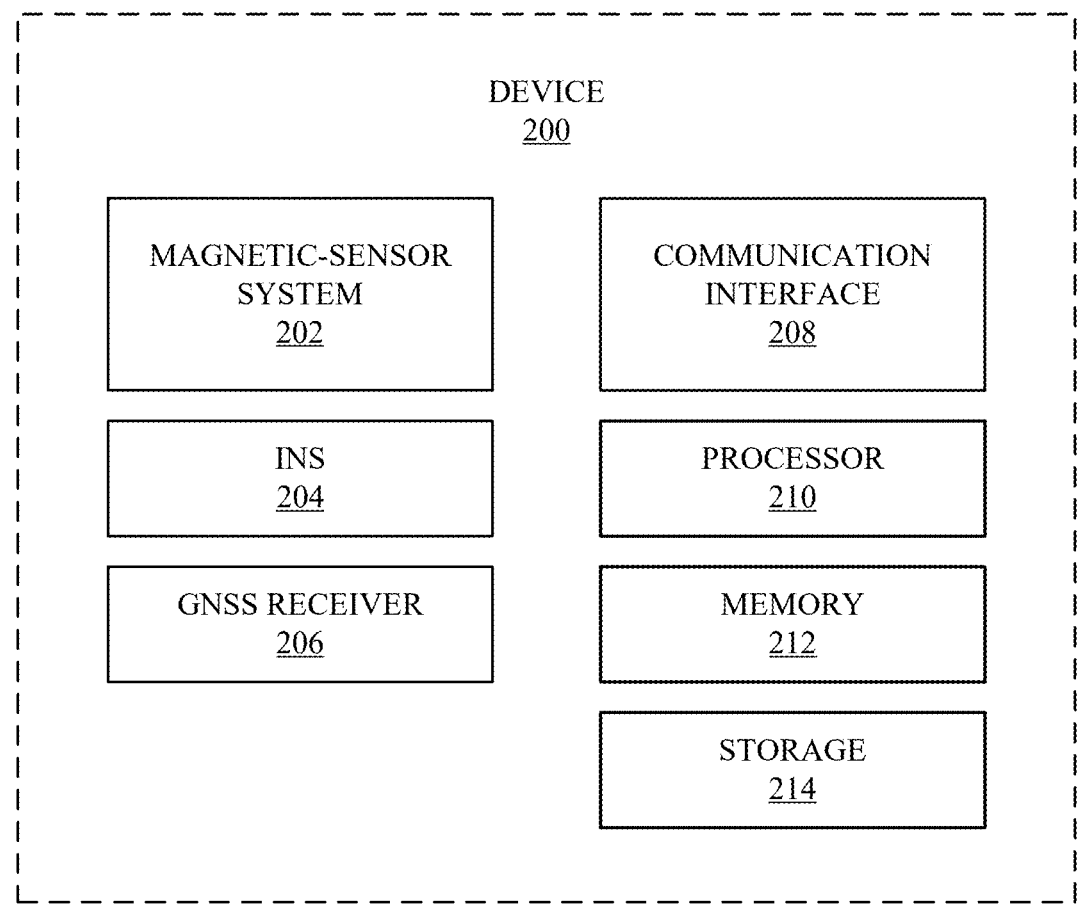
FIG. 2 illustrates an example device.

FIG. 2 illustrates an example device 200 including a magnetic-sensor system 202 and GNSS receiver 206. As an example and not by way of limitation, device 200 may, in particular embodiments, be a vehicle, robot, handheld device, or other device. Examples of vehicles include, but are not limited to, aircraft (such as, for example, airplanes, airships, and helicopters), satellites, spacecraft, ground vehicles, surface vessels or other vehicles, and underwater vehicles (such as, for example, submarines). A ground vehicle may use any suitable method(s) of terrestrial locomotion. For example, a ground vehicle may move from one location to another by rolling, sliding, walking, running, hopping, metachronal motion, slithering, brachiating, or any suitable combination of the foregoing using one or more wheels, treads, legs, or other structures. Examples of ground vehicles include, but are not limited to, conventional land vehicles, such as for example forklifts, cars, trucks, tractors, and tractor-trailer trucks. Other examples of ground vehicles include, but are not limited to, earth-moving, agricultural, or forestry equipment, such as for example excavators, backhoe loaders, bulldozers, skid-steer loaders, motor graders, crawler loaders, trenchers, scrapers, dump trucks, harvesters, mowers, balers, feller bunchers, shovel loggers, and other equipment. A surface vessel or other vehicle may be a boat or ship that operates on the surface of a body of water. One or more functions of a vehicle may be controlled by one or more human operators on board the vehicle, remotely by one or more human operators not on board the vehicle, or with a suitable degree of autonomy (such as autopilot assistance or full autonomy with no provision for human intervention or other control). A vehicle may, but need not (and need not necessarily be able to), carry one or more human passengers or crew. Although particular vehicles are described or illustrated herein, this disclosure contemplates any suitable vehicles.

Examples of robots include, but are not limited to drones, sUASs, unmanned aerial vehicles (UAVs), remotely piloted aircraft (RPAs), unmanned ground vehicles (UGVs), autonomous ground vehicles (AGVs), unmanned underwater vehicles (UUVs), remotely operated underwater vehicles (ROUVs), autonomous underwater vehicles (AUVs), autonomous surface vessels or vehicles (ASVs), unmanned or uncrewed surface vessels or vehicles (USVs), drone ships, and other robots. One or more functions of a robot may be controlled by one or more human operators on board the robot, remotely by one or more human operators not on board the robot, or with a suitable degree of autonomy (such as autopilot assistance or full autonomy with no provision for human intervention or other control). A robot may, but need not (and need not necessarily be able to), carry one or more human passengers or crew. Although particular robots are described or illustrated herein, this disclosure contemplates any suitable robots. Examples of handheld devices include, but are not limited to, mobile telephones, mobile computers, cameras, pagers, personal navigation devices, wearable computers, and smart cards. Although particular handheld devices are described or illustrated herein, this disclosure contemplates any suitable handheld devices with any suitable form factors. Moreover, although particular devices are described or illustrated herein, this disclosure contemplates any suitable machines, instruments, apparatuses, or other devices. For example, device 200 may be or be included in a payload-delivery system or an aiming or targeting system. Device 200 may include one or more devices 200, where appropriate.

In the example of FIG. 2, device 200 includes magnetic-sensor system 202, inertial navigation system (INS) 204, GNSS receiver 206, communication interface 208, processor 210, memory 212, and storage 214. Device 200 may also include one or more other components or systems not illustrated in the example of FIG. 2. For example, if device 200 is a vehicle, device 200 may also include one or more engines, motors, or propulsion systems. As another example, if device 200 is a mobile telephone, then device 200 may also include one or more batteries, one or more microphones, one or more speakers, and one or more touchscreens with associated controllers. Magnetic-sensor system 202 may include one or more magnetic sensors (such as, for example, magnetometers) and other hardware, software, or both for controlling and collecting measurements from the magnetic sensors. Hardware may include any suitable physical components or peripherals of a computer or other electronic system (such as one or more ICs). Software may include one or more computer programs or routines that can be executed by one or more physical components or peripherals of a computer or other electronic system. A computer program may include one or more sequences or other sets of rules, routines, or other instructions recorded in a form that can be executed by a computer system to perform a specific operation or series of operations. A routine may include a section of code that executes a specific task. Hardware or software may embody one or more computer programs or routines in whole or in part, and a computer program or routine may embody one or more algorithms in whole or in part. An algorithm may be a prescribed set of steps (or a method) to solve one or more problems or perform one or more tasks and may include one or more algorithms. Herein, reference to software may include firmware, which may be software stored in semipermanent memory, such as a programmable ROM (PROM), and may be nonvolatile. Although particular hardware, software, programs, routines, and algorithms are described or illustrated herein, this disclosure contemplates any suitable hardware, software, programs, routines, and algorithms. As described above, a magnetometer is a device that measures an external magnetic field or magnetic dipole moment. In particular embodiments, a magnetometer measures the direction, strength, or relative change of a magnetic field at a point in space. Although a particular magnetic-sensor system 202 is described or illustrated herein, this disclosure contemplates any suitable magnetic-sensor system. Magnetic-sensor system 202 may include one or more magnetic-sensor systems 202, where appropriate.

INS 204 may include one or more motion sensors, one or more rotation sensors, and other hardware, software, or both for controlling and collecting measurements from those sensors and may calculate by dead reckoning the position, orientation, or velocity (e.g. including direction and speed of movement) of device 200 using those measurements. INS 204 may also include one or more magnetic sensors, which may serve as an electronic compass or other instrument. INS 204 may also include one or more pressure sensors, which may serve as an altimeter, barometer, or bathymeter (or bathometer). INS 204 may include one or more inertial measurement units (IMUs). An IMU may include one or more motion sensors, one or more rotation sensors, and other hardware, software, or both for controlling and collecting measurements from those sensors and may calculate a specific force, angular rate, and orientation of an object (e.g. device 200) using those measurements. In addition or as an alternative, the IMU may calculate an absolute spatial displacement of the object using those measurements. The IMU may also include one or more pressure sensors. Herein, reference to an INS may include an IMU, an inertial guidance system, or an inertial instrument, and vice versa, where appropriate. Although a particular INS is described or illustrated herein, this disclosure contemplates any suitable INS. Although a particular IMU is described or illustrated herein, this disclosure contemplates any suitable IMU. INS 204 may include one or more INSs 204, where appropriate.

GNSS receiver 206 may include hardware, software, or both for receiving signals from GNSS satellites and calculating a position of GNSS receiver 206 (or, by extension, device 200 including GNSS receiver 206) from those signals. GNSS is a general term used to describe a network of satellites that can be used to produce position, navigation, and time (PNT) data sets. GPS is a widely used form of GNSS. Regional applications of such systems are also used to generate more regionally specific PNT data. For example, Galileo can be used in Europe; Global'naya Navigatsionnaya Sputnikovaya Sistema (GLONASS) can be used in Russia; and BeiDou Navigation Satellite System (BDS) can be used in China. GNSSs can have failure points. For example, some GNSSs lose reliability when operated inside buildings or in regions where network communication to the device is intermittent. Some GNSSs lose reliability when operated in dense city environments where large buildings interfere with communication signals. Some GNSSs lose reliability when operated in regions such as caves, tunnels, and mountains that impede reception of signals from GNSS satellites. Moreover, some GNSSs are susceptible to malicious attacks by electronic interference or physical intervention that degrade their reliability. Although a particular GNSS receiver 206 is disclosed and illustrated, this disclosure contemplates any suitable GNSS receiver. GNSS receiver 206 may include one or more GNSS receivers 206, where appropriate.

Communication interface 208 may include hardware, software, or both providing one or more interfaces for wired communication, wireless communication, or optical communication (such as, for example, fiber-optic communication), or a combination of the foregoing, between device 200 and one or more other devices or computer systems or one or more networks. As an example and not by way of limitation, communication interface 208 may provide one or more interfaces for radio communication. In addition or as an alternative, communication interface 208 may provide one or more interfaces for communication with one or more wireless networks, such as, for example, one or more wireless ad hoc networks; one or more Bluetooth networks or other wireless personal area networks (WPANs); one or more Wi-Fi networks or other wireless local area networks (WLANs); one or more wide area networks (WANs); one or more Worldwide Interoperability for Microwave Access (WiMAX) networks or other wireless metropolitan area networks (WMANs); or one or more other suitable wireless networks. In addition or as an alternative, communication interface 208 may provide one or more interfaces for communication with one or more cellular networks, such as for example, one or more Global System for Mobile Communications (GSM) networks; one or more Code-Division Multiple Access (CDMA) networks; one or more General Packet Radio Service (GPRS) networks; one or more Wideband Code-Division Multiple Access (WCDMA) networks; one or more Enhanced Data rates for GSM Evolution (EDGE) networks; one or more CDMA2000 networks; one or more 3rd Generation Partnership Project (3GPP) 5G networks; or one or more other suitable cellular networks. In addition or as an alternative, communication interface 208 may provide one or more interfaces for communication with one or more low-power wide-area network (LPWANs). In addition or as an alternative, communication interface 208 may provide one or more interfaces for communication with one or more mobile-satellite services (MSSs). In addition or as an alternative, communication interface 208 may provide one or more interfaces for communication with one or more wireless sensor networks (WSNs). In addition or as an alternative, communication interface 208 may provide one or more interfaces for near-field communication (NFC). Although a particular communication interface 208 is disclosed and illustrated, this disclosure contemplates any suitable communication interface. Communication interface 208 may include one or more communication interfaces 208, where appropriate.

Processor 210 may include hardware for executing instructions, such as those making up a computer program or other software. As an example and not by way of limitation, to execute instructions, processor 210 may retrieve (or fetch) the instructions from an internal register, an internal cache, memory 212, or storage 214; decode and execute them; and then write one or more results to an internal register, an internal cache, memory 212, or storage 214. Although this disclosure describes or illustrates a particular processor 210, this disclosure contemplates any suitable processor. Processor 210 may include one or more processors 210, where appropriate.

Memory 212 may include main memory for storing instructions for processor 210 to execute or data for processor 210 to operate on. As an example and not by way of limitation, instructions may be loaded from storage 214 or another source to memory 212. Processor 210 may then load the instructions from memory 212 to an internal register or internal cache. To execute the instructions, processor 210 may retrieve the instructions from the internal register or internal cache and decode them. During or after execution of the instructions, processor 210 may write one or more results (which may be intermediate or final results) to the internal register or internal cache. Processor 210 may then write one or more of those results to memory 212. Although this disclosure describes or illustrates particular memory 212, this disclosure contemplates any suitable memory. Memory 212 may include one or more memories 212, where appropriate.

Storage 214 may include mass storage for data or instructions. As an example and not by way of limitation, storage 214 may include a hard disk drive (HDD), a floppy disk drive, flash memory, an optical disc, a magneto-optical disc, magnetic tape, or a Universal Serial Bus (USB) drive or a combination of two or more of these. Storage 214 may include removable or non-removable (or fixed) media, where appropriate. Storage 214 may be internal or external to device 200, where appropriate. Storage 214 may be non-volatile, solid-state memory. Storage 214 may include read-only memory (ROM). Where appropriate, this ROM may be mask-programmed ROM, PROM, erasable PROM (EPROM), electrically erasable PROM (EEPROM), electrically alterable ROM (EAROM), or flash memory or a combination of two or more of these. This disclosure contemplates mass storage 214 taking any suitable physical form. Storage 214 may include one or more storage control units facilitating communication between processor 210 and storage 214, where appropriate. Where appropriate, storage 214 may include one or more storages 214. Although this disclosure describes or illustrates particular storage 214, this disclosure contemplates any suitable storage.

Although a particular device 200 having a particular arrangement of particular numbers of particular components and systems is described or illustrated herein, this disclosure contemplates any suitable device having any suitable arrangement of any suitable numbers of any suitable components or systems. As an example and not by way of limitation, a device contemplated by this disclosure may include magnetic-sensor system 202, processor 210, memory 212, and storage 214 and not include INS 204, GNSS receiver 206, or communication interface 208. A device contemplated by this disclosure may include some, all, or none of magnetic-sensor system 202, INS 204, GNSS receiver 206, communication interface 208, processor 210, memory 212, and storage 214. In addition, as described above, a device contemplated by this disclosure may include one or more components or systems not illustrated in FIG. 2 or described with respect thereto or otherwise described or illustrated herein. A device contemplated by this disclosure may include one or more fusion filters (which may be a set of instructions functioning as one or more fusion filters when executed) stored in memory 212 or storage 214 and executable by processor 210, magnetic-sensor system 202, INS 204, or any other suitable component or system of device 200. In particular embodiments, a fusion filter is an algorithm that may be used in sensor fusion to combine data from multiple sensors, resulting in a more accurate estimate of a system being measured. Herein, reference to a fusion filter may include sensor fusion, and vice versa, where appropriate. A fusion filter may reduce errors and uncertainty and thereby improve the accuracy and reliability of the system. A fusion filter may combine data from multiple sensors (including, e.g., one or more magnetic sensors (e.g. magnetometers), motion sensors (e.g. accelerometers), rotation sensors (e.g. gyroscopes), pressure sensors (e.g. barometers), or other sensors) measuring the same variable(s), such as position or orientation, and then apply statistical techniques to that data to estimate the most likely value of the variable(s). An advantage of fusion filters is their ability to deal with noisy or unreliable sensor data. By combining data from multiple sources, a fusion filter may reduce the impact of any individual sensor's errors or biases, resulting in a more accurate estimate of the system being measured.

The fusion filter may receive or otherwise access data from one or more of magnetic-sensor system 202, INS 204, one or more other sensors or sensor systems of device 200, GNSS receiver 206, communication interface 208, or one or more other components, systems, or sub-systems of device 200 and combine that data to produce location information for device 200 (including, for example, position, orientation, or velocity (e.g. including direction and speed of movement) of device 200) that is more certain and contains fewer errors than the original data. The fusion filter may be a component or sub-system of magnetic-sensor system 202, INS 204, or another component, system, or sub-system of device 200. Although a particular fusion filter is described or illustrated herein, this disclosure contemplates any suitable fusion filter.

Two or more of magnetic-sensor system 202, INS 204, GNSS receiver 206, communication interface 208, processor 210, memory 212, storage 214, or any other component or system of device 200 may be connected to each other directly or functionally, physically, or logically co-located with each other in whole or in part. For example, magnetic-sensor system 202 (or one or more components or functions of magnetic-sensor system 202) may be a component of INS 204. In addition or as an alternative, INS 204 may include its own dedicated processor 210, memory 212, or storage 214. In addition or as an alternative, magnetic-sensor system 202 and INS 204 may be subsystems of a system or component of device 200, which may include its own dedicated processor 210, memory 212, or storage 214. One or more functions described or illustrated herein as being provided by one or more particular components or systems of device 200 may be provided by one or more other suitable components or systems of device 200 and need not necessarily be provided by the particular components or systems of device 200 described or illustrated herein as providing those functions.

To provide more accurate, precise, or reliable data from the magnetic sensors of magnetic-sensor system 202 (and thus more accurate, precise, or reliable heading or other location information about device 200), the magnetic sensors may be calibrated using one or more embodiments of the calibration-coefficient algorithm disclosed herein or another suitable algorithm. In addition, navigation may be performed by or with device 200 in whole or in part using that calibrated data. In addition or as an alternative, the dynamic-parameter algorithm disclosed herein may be implemented by or with device 200 in whole or in part. In addition or as an alternative, sensor fusion (which may include the dynamic selection of DTW or other parameters for navigation with a magnetic-field map) may be performed by or with device 200 in whole or in part. In addition or as an alternative, geolocation information may be validated by or with device 200 in whole or in part.

Particular embodiments may generate or use location information for device 200. Localization (or localizing) may include generating or using location information about device 200 (e.g. determining a location of device 200), which may be performed in whole or in part by device 200 or one or more other devices. Location information about device 200 (or any other suitable device) may include the device's location (e.g. one or more points in space defined using any suitable two- or three-dimensional coordinate system), orientation, heading, velocity, a combination of two or more of these, or any other suitable location information. Examples of two- or three-dimensional coordinate systems include the Geographic Coordinate System (GCS), which identifies positions on the Earth in degrees of latitude and longitude; the Earth-Centered Earth-Fixed (ECEF) coordinate system; the Universal Transverse Mercator (UTM) grid system; or the Universal Polar Stereographic (UPS) grid system; or any other suitable coordinate system. Although particular location information is described or illustrated herein, this disclosure contemplates any suitable location information. Navigation (or navigating) may include determining a location, heading, orientation, bearing, course, track, path, trajectory, or velocity of device 200, which may be performed in whole or in part by device 200 or one or more other devices. One or more of these may be relative to an intended destination, and guidance or instructions for reaching that destination may also be provided. Herein, reference to localizing (or localization) may include navigating (or navigation), and vice versa, where appropriate.

Magnetic-field data may be data including magnetic-field values, such as, e.g., one or more raw or calibrated measurements of one or more values of a magnetic field.

Magnetic-field data may include or be included in one or more magnetic recordings or one or more magnetic-field maps. Magnetic-sensor data may be data from one or more magnetic sensors, such as, e.g., one or more raw or calibrated measurements of one or more values of a magnetic field by the magnetic sensors. Magnetic-sensor data may include magnetic-field data, and vice versa, where appropriate. Where appropriate, magnetic-sensor data or magnetic-field data may (but need not necessarily) include location information. Similarly, where appropriate, location information may (but need not necessarily) include magnetic-sensor data or magnetic-field data. Herein, reference to magnetic-sensor data or magnetic-field data may include location information, and vice versa, where appropriate. Moreover, reference herein to one or more magnetic measurements may include magnetic-sensor data or magnetic-field data, and vice versa, where appropriate.

A magnetic-field map may include data organized in any suitable manner (such as a relational or other database) and recorded in any suitable format (such as, for example, JavaScript Object Notation (JSON), binary (such as .bin, .dat., .db), or other format) representing magnetic-field values that correspond to points or locations within a two- or three-dimensional region (e.g., with an area or volume of 60 square or cubic miles, 215 square or cubic miles, 2,000 square or cubic miles, or any other suitable area or volume). A magnetic-field map may include or be included in one or more georeferenced tagged-image-file-format (GeoTIFF) or other image files. In particular embodiments, a magnetic-field map may be similar to a topographic map, indicating, e.g., magnetic-field magnitude or direction instead of elevation. A magnetic-field map may include one or more magnetic recordings. In addition, a magnetic-field map may include one or more magnetic-field maps. Reference herein to a magnetic-field map may include data associated with the magnetic-field map, the magnetic-field values and their corresponding locations represented by the data, a symbolic or graphical representation of either or both of the foregoing, or a combination of the foregoing, and vice versa, where appropriate.

In particular embodiments, the heading of a device (such as, for example, device 200) is the direction that the device (or one or more axes of the device) points or is oriented toward relative to a reference direction. For example, if the bow of a surface vessel or the nose of an aircraft points due north, then the heading of that vessel or aircraft is due north. In particular embodiments, the orientation of an object is the angular position or rotational alignment of the object or its coordinate system relative to a reference frame. Herein, reference to an orientation of a device may include one or more of the device's orientation angles (e.g. heading (or yaw), elevation (or pitch), or roll (or bank)) or quaternion in a joint rectangular coordinate frame relative to the ECEF coordinate frame or other coordinate frame, where appropriate. Herein, reference to orientation may include heading, direction, or both, and vice versa, or those terms may be used interchangeably, where appropriate.

A reference direction on Earth may be magnetic north, magnetic south, true north, true south, or any other cardinal or other direction on Earth. Although particular reference directions with respect to Earth are described or illustrated herein, this disclosure contemplates any reference directions with respect to any suitable planet or celestial body. A reference direction on Earth may, but need not, be parallel or tangent to Earth's surface. Magnetic north and magnetic south on Earth are locations on Earth's surface where Earth's magnetic-field lines are substantially vertical (i.e.

they are substantially perpendicular to Earth's surface). Over time, those locations shift. True north and true south (i.e. Earth's north and south poles) are locations where Earth's rotational axis intersects Earth's surface. Those locations do not shift over time. In particular embodiments, a device may have a heading relative to a reference direction when the device is on Earth's surface (e.g. on land or on water), below Earth's surface (e.g. underground or underwater), or above Earth's surface (e.g. in the air or beyond Earth's atmosphere).

A reference direction may, but need not, refer to or be determined by a substantially fixed location relative to the device. For example, as discussed above, a reference direction on Earth may be magnetic north, magnetic south, true north, or true south on Earth, each of which refers to a particular location on Earth's surface. In addition or as an alternative, a reference direction may refer to or be determined by Polaris or another star or location in space (whether or not indicated by a celestial body). Although particular locations are described or illustrated herein as being referred to by or determining particular reference directions, this disclosure contemplates any suitable locations being referred to by or determining any suitable reference directions. In addition or as an alternative, a reference direction may refer to or be determined by a two- or three-dimensional grid, which may be projected onto a map. For example, in particular embodiments, grid north—as defined by vertical lines on a map's coordinate system (e.g. UTM or MGRS) and pointing toward the top of the map—may be a reference direction.

A heading may be defined in one, two, three, or any other suitable number of dimensions. Similarly, a reference direction may also be defined in one, two, three, or any other suitable number of dimensions. The heading of a device may be distinct from a bearing or course of the device, which may be an intended or actual direction or path of the device. In the case of a ground vehicle on Earth, the heading of the vehicle may be the orientation of the vehicle's longitudinal axis relative to true north or magnetic north on Earth. In particular embodiments, heading may be used to aim, align, position, point, sight, or steer a vehicle, equipment, or other device. The heading of a device may change as the device rotates about one or more of its axes. Herein, as appropriate, reference to a device being oriented at or toward an object or location or in a direction includes the device being aimed, aligned, positioned, pointed, sighted, or steered at or toward that object or location or in that direction, and vice versa.

A device may move in a direction other than its heading, for example, due to drift. For example, if an aircraft in flight has a heading of 270° relative to true north, then the aircraft is physically oriented due west. With that heading, if the aircraft does not experience any lateral (e.g. north or south) wind, then the aircraft will travel due west as it flies. However, if the aircraft experiences significant northerly wind, then the aircraft will travel south of due west as it flies. In particular embodiments, the bearing of a device may be the direction to a location (e.g. of a place or object) from the device's current position. For example, the bearing may be an angle relative to magnetic north on Earth of a substantially straight line connecting the device to the location. For example, if a lighthouse is located at a bearing of 45° relative to true north (northeast) from a current location of a surface vessel, then the vessel could reach the lighthouse by heading in a straight line at 45° relative to true north from the vessel's current position. In particular embodiments, bearings to waypoints or objects may be used for navigation. A bearing may be absolute or relative. An absolute bearing is relative to magnetic or true north or another substantially fixed direction. A relative bearing between a device and a particular location is relative to the device's heading.

In particular embodiments, the course or track of a device is an intended path or direction of travel. For example, the course of a surface vessel may be the direction that the vessel is being steered in to reach an intended destination. An intended course (which may be referred to as a course to steer or planned course) of a device may be the direction over Earth's surface that the device (or a pilot or other user of the device) intends to make good, which may be plotted on a chart. For example, a course of 90° relative to true north (east) may be intended for 10 miles to reach a particular location. An actual course of a device may be an actual path over Earth's surface that is followed or taken by the device. If the device's heading is maintained correctly against drift, then the device's actual course will match the intended course. If not, then the device's actual course will deviate from its intended course.

In particular embodiments, the heading of a device can be thought of as where the device is pointing and the course of the device can be thought of as where the device is going. In the absence of drift, heading and course will be the same. However, if the device experiences drift (e.g. caused by winds or currents), then the device may move in a direction different from where the device is pointing. In particular embodiments, the heading of a device may be adjusted as it moves to compensate for drift (e.g. caused by winds or currents) or other factors so that the device's actual course matches its intended course.

Figure 3:
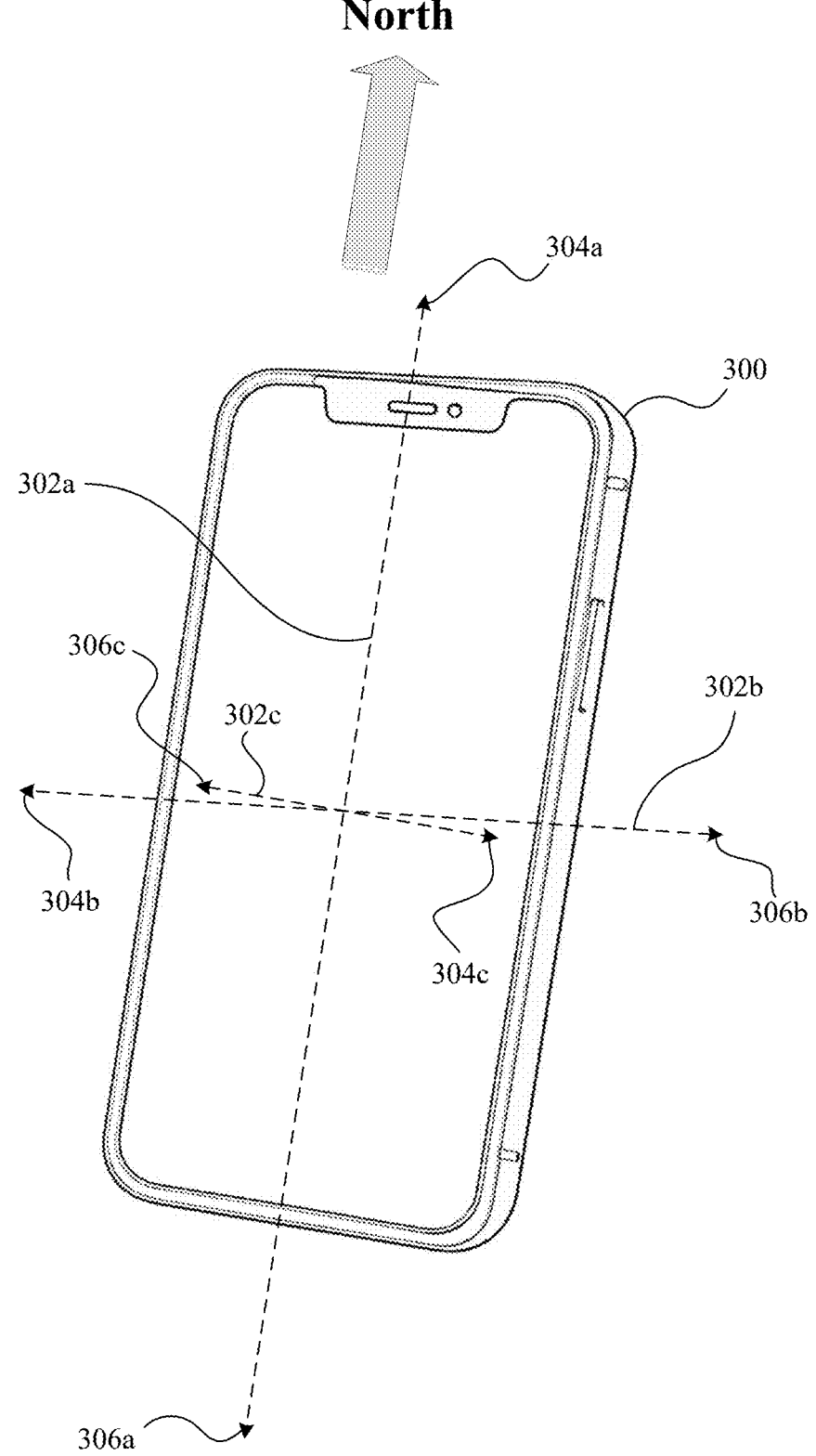
FIG. 3 illustrates an example handheld device.

FIG. 3 illustrates an example handheld device 300. Handheld device 300 may be a smartphone and may include one or more magnetic sensors. Handheld device 300 may also include one or more pressure, motion, rotation, or other sensors. Handheld device 300 may have a vertical axis 302a, horizontal axis 302b, and longitudinal axis 302c. An axis of handheld device 300 (or any suitable device) may be an imaginary straight line around which handheld device 300 is symmetrically or asymmetrically arranged or balanced or may rotate. Vertical axis 302a may run vertically from the top to the bottom (or from the bottom to the top) of handheld device 300; horizontal axis 302b may run horizontally from the left side to the right side (or from the right side to the left side) of handheld device 300; and longitudinal axis 302c may run longitudinally from the front to the back (or from the back to the front) of handheld device 300. Vertical axis 302a may have a positive sense 304a and a negative sense 306a; horizontal axis 302b may have a positive sense 304b and a negative sense 306b; and longitudinal axis 302c may have a positive sense 304c and a negative sense 306c. The positive sense of an axis may be the direction of increasing coordinate values along the axis, and the negative sense of the axis may be the direction of decreasing coordinate values along the axis. Although handheld device 300 is described or illustrated as having a particular number of particular axes with particular positive and negative directions, this disclosure contemplates handheld device 300 (or any other suitable device) having any suitable number of any suitable axes with any suitable positive or negative directions.

Handheld device 300 may use data from its magnetic sensors to determine its heading. (Data from other sensors of handheld device 300 may also be used to determine its heading.) The heading of handheld device 300 may be the direction that positive sense 304a points or is oriented toward relative to a reference direction (such as, for example, true or magnetic north). Alternatively, the heading of handheld device 300 may be the direction that positive sense 304c points or is oriented toward relative to the reference direction. In addition, the heading of handheld device 300 may be determined by different senses or different axes at different times. For example, at one time, if it is determined that positive sense 304a is pointing or oriented substantially up (e.g. relative to the center of Earth), then the heading of handheld device 300 may be determined by the direction that positive sense 304c points or is oriented toward relative to a reference direction. At another time, if it is determined that negative sense 306c is pointing or oriented substantially up, then the heading of handheld device 300 may be determined by the direction that positive sense 304a points or is oriented toward relative to the reference direction. Handheld device 300 may have one or more headings simultaneously or at different times, and different headings of handheld device 300 (e.g. for use by different components or systems or in different operations or functions of handheld device 300) may be determined according to different senses or different axes simultaneously or at different times. Although particular headings of handheld device 300 are described or illustrated as being particular directions that particular senses of particular axes of handheld device 300 point or are oriented toward, this disclosure contemplates any suitable heading of handheld device 300 (or any other suitable device) being any suitable direction that any suitable sense of any suitable axis of handheld device 300 points or is oriented toward.

The heading of handheld device 300 may be used for navigation by or with handheld device 300, to generate or update one or more portions of one or more magnetic-field maps, or for any other suitable purpose. To provide more accurate, precise, or reliable data from the magnetic sensors of handheld device 300 (and thus more accurate, precise, or reliable heading or other location information about handheld device 300), the magnetic sensors may be calibrated using one or more embodiments of the calibration-coefficient algorithm disclosed herein or another suitable algorithm. In addition, navigation may be performed by or with handheld device 300 in whole or in part using that calibrated data. In addition or as an alternative, the dynamic-parameter algorithm disclosed herein may be implemented by or with handheld device 300 in whole or in part. In addition or as an alternative, sensor fusion (which may include the dynamic selection of DTW or other parameters for navigation with a magnetic-field map) may be performed by or with handheld device 300 in whole or in part. In addition or as an alternative, geolocation information may be validated by or with handheld device 300 in whole or in part.

Figure 4:
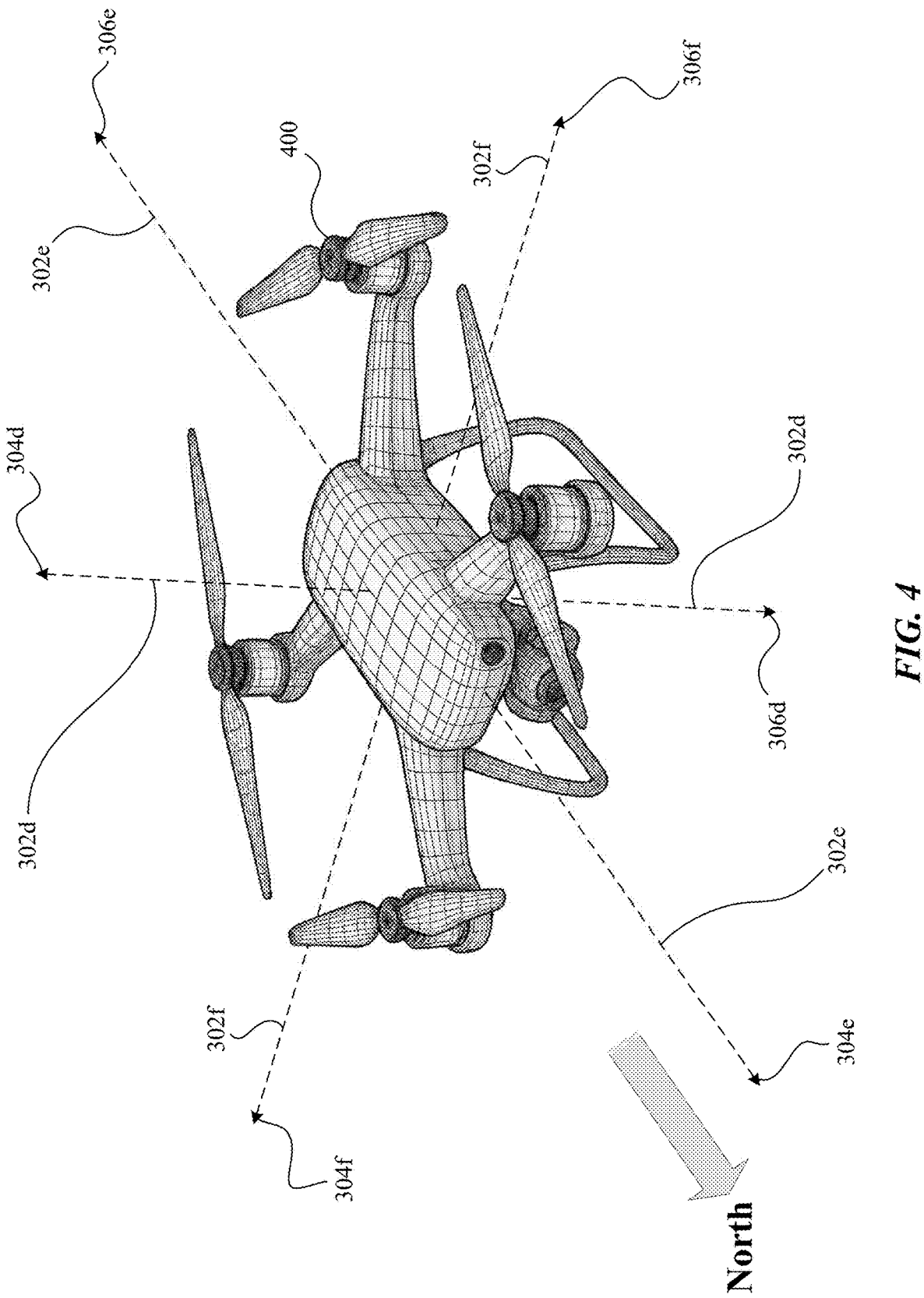
FIG. 4 illustrates an example small unmanned aircraft system (sUAS).

FIG. 4 illustrates an example sUAS 400. sUAS 400 may include one or more magnetic sensors. sUAS 400 may also include one or more pressure, motion, rotation, or other sensors. sUAS 400 may have a vertical axis 302d, longitudinal axis 302e, and horizontal axis 302f. Vertical axis 302d may run vertically from the top to the bottom (or from the bottom to the top) of sUAS 400; horizontal axis 302f may run horizontally from the left side to the right side (or from the right side to the left side) of sUAS 400; and longitudinal axis 302e may run longitudinally from the front to the back (or from the back to the front) of sUAS 400. Vertical axis 302d may have a positive sense 304d and a negative sense 306d; horizontal axis 302f may have a positive sense 304f and a negative sense 306f; and longitudinal axis 302e may have a positive sense 304e and a negative sense 306e. Although sUAS 400 is described or illustrated as having a particular number of particular axes with particular positive and negative directions, this disclosure contemplates sUAS 400 (or any other suitable device) having any suitable number of any suitable axes with any suitable positive or negative directions.

sUAS 400 may use data from its magnetic sensors to determine its heading. (Data from other sensors of sUAS 400 may also be used to determine its heading.) The heading of sUAS 400 may be the direction that positive sense 304e points or is oriented toward relative to a reference direction (such as, for example, true or magnetic north). In addition, the heading of sUAS 400 may be determined by different senses or different axes at different times. For example, at one time, if it is determined that positive sense 304d is pointing or oriented substantially up (e.g. relative to the center of Earth), then the heading of sUAS 400 may be determined by the direction that positive sense 304e points or is oriented toward relative to a reference direction. At another time, if it is determined that negative sense 306e is pointing or oriented substantially up, then the heading of sUAS 400 may be determined by the direction that positive sense 304d points or is oriented toward relative to the reference direction. sUAS 400 may have one or more headings simultaneously or at different times, and different headings of sUAS 400 (e.g. for use by different components or systems or in different operations or functions of sUAS 400) may be determined according to different senses or different axes simultaneously or at different times. Although particular headings of sUAS 400 are described or illustrated as being particular directions that particular senses of particular axes of sUAS 400 point or are oriented toward, this disclosure contemplates any suitable heading of sUAS 400 (or any other suitable device) being any suitable direction that any suitable sense of any suitable axis of sUAS 400 points or is oriented toward.

The heading of sUAS 400 may be used for navigation by or with sUAS 400, to generate or update one or more portions of one or more magnetic-field maps, or for any other suitable purpose. To provide more accurate, precise, or reliable data from the magnetic sensors of sUAS 400 (and thus more accurate, precise, or reliable heading or other location information about sUAS 400), the magnetic sensors may be calibrated using one or more embodiments of the calibration-coefficient algorithm disclosed herein or another suitable algorithm. In addition, navigation may be performed by or with sUAS 400 in whole or in part using that calibrated data. In addition or as an alternative, the dynamic-parameter algorithm disclosed herein may be implemented by or with sUAS 400 in whole or in part. In addition or as an alternative, sensor fusion (which may include the dynamic selection of DTW or other parameters for navigation with a magnetic-field map) may be performed by or with sUAS 400 in whole or in part. In addition or as an alternative, geolocation information may be validated by or with sUAS 400 in whole or in part.

Figure 5:
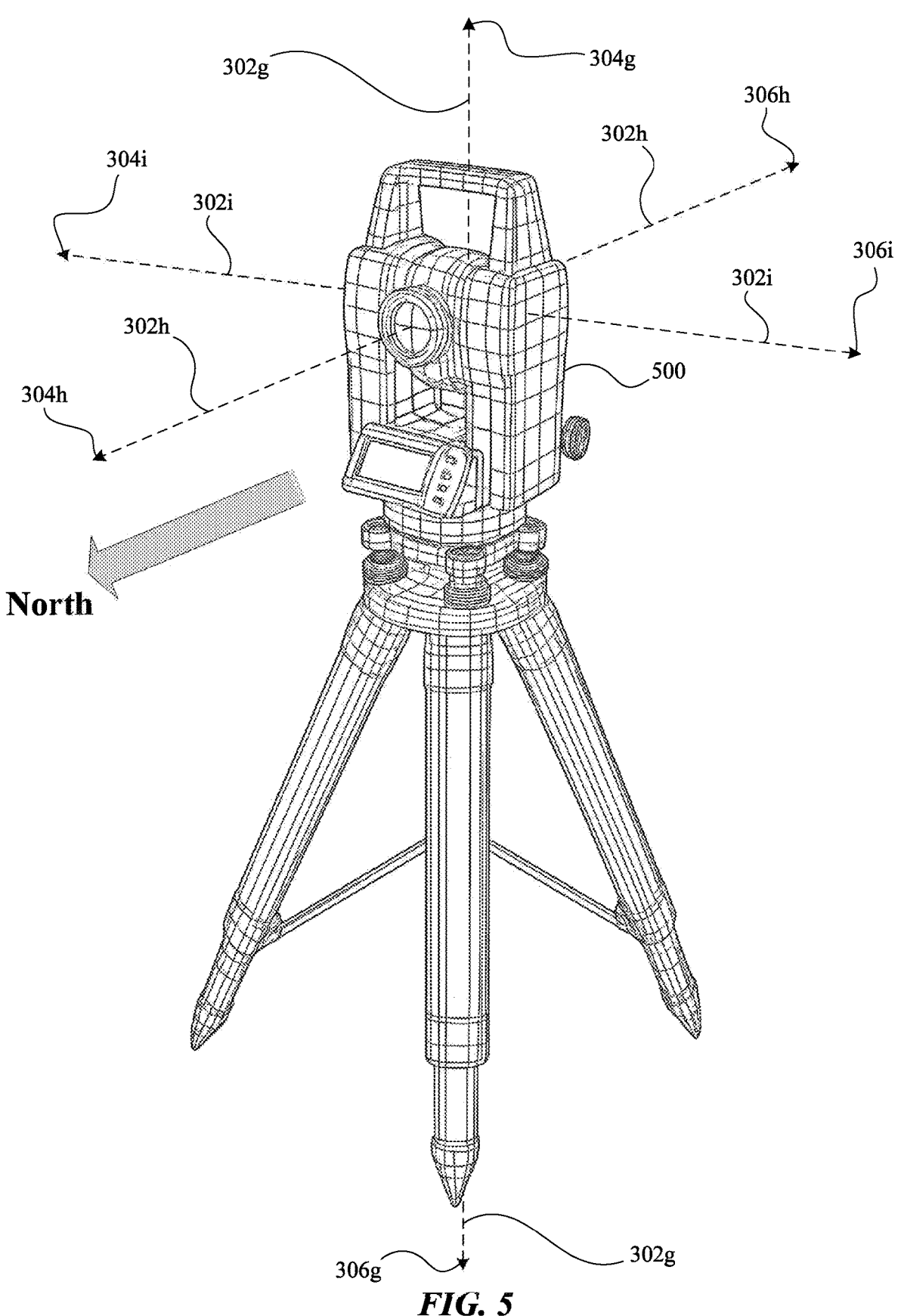
FIG. 5 illustrates an example theodolite mounted on an example tripod.

FIG. 5 illustrates an example theodolite 500 mounted on an example tripod. A theodolite may be a surveying tool used to measure angles. Theodolite 500 may include one or more magnetic sensors. Theodolite 500 may also include one or more pressure, motion, rotation, or other sensors. Theodolite 500 may have a vertical axis 302g, longitudinal axis 302h, and horizontal axis 302i. Vertical axis 302g may run vertically from the top to the bottom (or from the bottom to the top) of theodolite 500; horizontal axis 302i may run horizontally from the left side to the right side (or from the right side to the left side) of theodolite 500; and longitudinal axis 302h may run longitudinally from the front to the back (or from the back to the front) of theodolite 500. Vertical axis 302g may have a positive sense 304g and a negative sense 306$g$; horizontal axis 302$i$ may have a positive sense 304$i$ and a negative sense 306$i$; and longitudinal axis 302$h$ may have a positive sense 304$h$ and a negative sense 306$h$. Although theodolite 500 is described or illustrated as having a particular number of particular axes with particular positive and negative directions, this disclosure contemplates theodolite 500 (or any other suitable device) having any suitable number of any suitable axes with any suitable positive or negative directions.

Theodolite 500 may use data from its magnetic sensors to determine its heading. (Data from other sensors of theodolite 500 may also be used to determine its heading.) The heading of theodolite 500 may be the direction that positive sense 304$h$ points or is oriented toward relative to a reference direction (such as, for example, true or magnetic north). In addition or as an alternative, the heading of theodolite 500 may be the direction that positive sense 304$g$ points or is oriented toward relative to, e.g., a straight line running through the center of theodolite 500 and the center of Earth. Theodolite 500 may have one or more headings simultaneously or at different times, and different headings of theodolite 500 (e.g. for use by different components or systems or in different operations or functions of theodolite 500) may be determined according to different senses or different axes simultaneously or at different times. Although particular headings of theodolite 500 are described or illustrated as being particular directions that particular senses of particular axes of theodolite 500 point or are oriented toward, this disclosure contemplates any suitable heading of theodolite 500 (or any other suitable device) being any suitable direction that any suitable sense of any suitable axis of theodolite 500 points or is oriented toward.

Heading or other location information about theodolite 500 may be used to measure an angle for surveying, to determine a location of theodolite 500, to generate or update one or more portions of one or more magnetic-field maps, or for any other suitable purpose. To provide more accurate, precise, or reliable data from the magnetic sensors of theodolite 500 (and thus more accurate, precise, or reliable heading or other location information about theodolite 500), the magnetic sensors may be calibrated using one or more embodiments of the calibration-coefficient algorithm disclosed herein or another suitable algorithm. In addition, navigation (including the determination of heading or orientation) may be performed by or with theodolite 500 in whole or in part using that calibrated data. In addition or as an alternative, the dynamic-parameter algorithm disclosed herein may be implemented by or with theodolite 500 in whole or in part. In addition or as an alternative, sensor fusion (which may include the dynamic selection of DTW or other parameters for navigation with a magnetic-field map) may be performed by or with theodolite 500 in whole or in part. In addition or as an alternative, geolocation information may be validated by or with theodolite 500 in whole or in part.

As described above, particular embodiments facilitate optimizing calibration coefficients for more accurate, precise, or reliable calibration of a magnetic sensor. This may be done using a calibration-coefficient algorithm that includes an optimization-based approach that determines more accurate, precise, or reliable calibration coefficients than conventional calibration techniques. The calibration coefficients may be optimal shift or scaling factors for the magnetic sensor, and they may be determined after conventional calibration and used for additional calibration of the magnetic sensor. Particular embodiments of the calibration-coefficient algorithm may increase the accuracy, precision, or reliability of the magnetic sensor and may be used to facilitate more accurate, precise, or reliable heading or other location information in indoor or outdoor environments, e.g., from an electronic compass. An electronic compass may be any electronic device that measures its ambient or other magnetic field (such as the GMF). Based on that measurement, the electronic compass may determine a magnetic or other heading. An electronic compass may include one or more magnetic sensors, and reference herein to an electronic compass may include a magnetic sensor, or vice versa, where appropriate. An electronic compass may be used with or be a component of or included in a device 200, 300, 400, or 500 or other suitable device. Herein, where appropriate, reference to something being optimized, optimal, or the like includes it being (or being made to be) more effective or efficient with respect to one or more particular functions and does not require it to be (or be made to be) best, ideal, perfect, or superlative. For example, optimizing calibration coefficients may include determining shift or scaling factors that are more accurate, precise, or reliable than similar factors determined by conventional calibration techniques, but are not necessarily best, ideal, perfect, or superlative. Similarly, an optimization-based approach or the like may include an approach with one or more mathematical operations that attempt to minimize or maximize (or significantly reduce or increase) one or more specific functions according to one or more particular criteria within one or more particular constraints.

Figure 6:
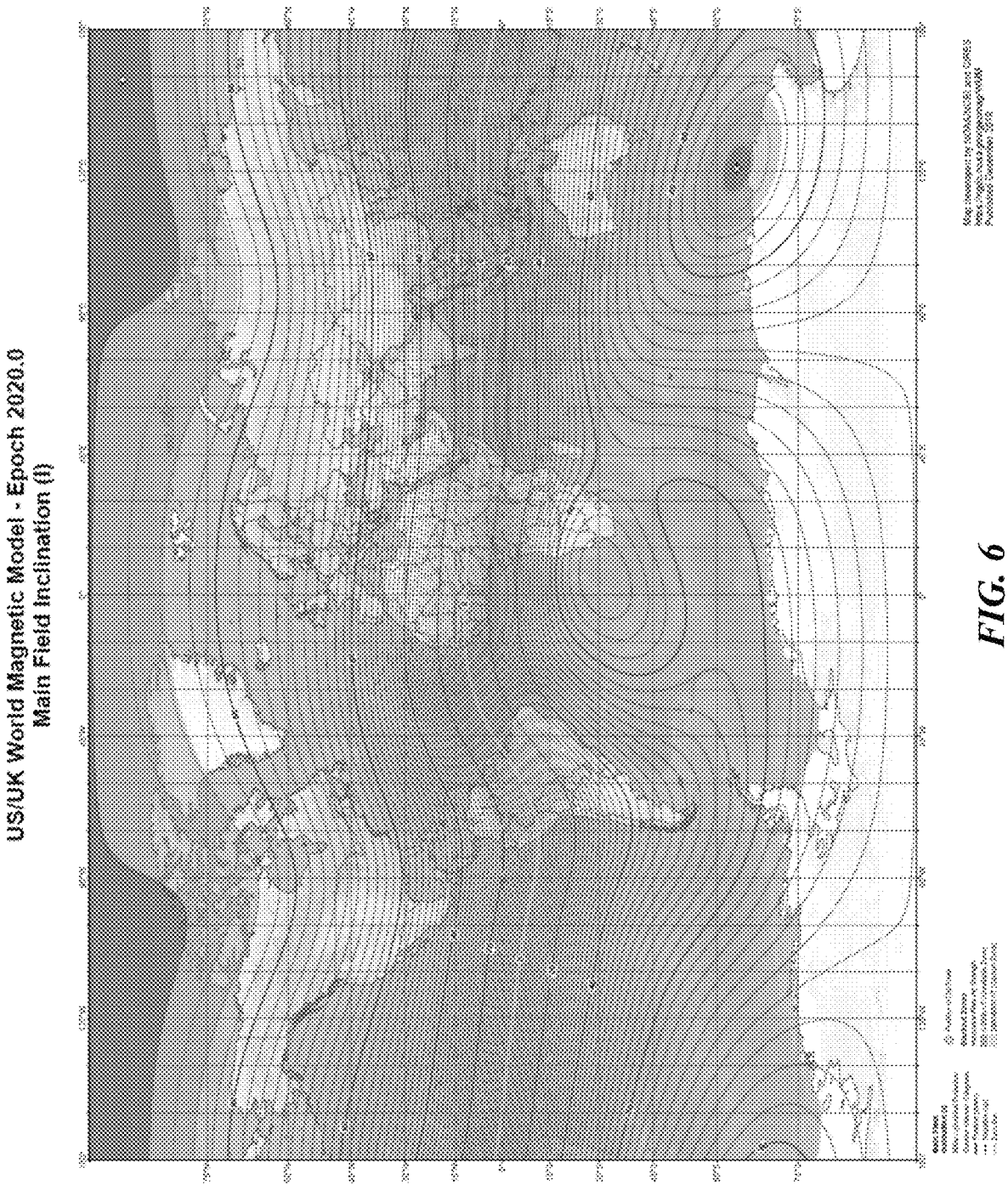
FIG. 6 illustrates magnetic inclination over the surface of Earth according to the US/UK World Magnetic Model (WMM) for 2020-2025.

Magnetic anomalies may significantly decrease the accuracy of an electronic compass (even in outdoor regions), and larger anomalies may cause greater deviation from accurate electronic-compass readings. However, databases like the National Oceanic and Atmospheric Administration's (NOAA's) WMM (which may also be referred to as the US/UK WMM for 2020-2025), of which a version may be found at https://www.ncei.noaa.gov/products/world-magnetic-model, may accurately indicate the strength or other magnetic-field values of the GMF at specific global locations. Other such databases include the Enhanced Magnetic Model (EMM) (such as EMM 2017 or and EMM2017 Mesh), a version of which may be found at https://www.ncei.noaa-.gov/products/enhanced-magnetic-model); the International Geomagnetic Reference Field (IGRF) model, a version of which may be found at https://www.ncei.noaa.gov/products/international-geomagnetic-reference-field; or the Earth Magnetic Anomaly Grid 2-arc-minute resolution (EMAG2) model, a version of which can be found at https://www.ncei.noaa.gov/products/earth-magnetic-model-anomaly-grid-2. Although particular databases indicating particular magnetic-field values of particular magnetic fields at particular locations are described and illustrated, this disclosure contemplates any suitable databases indicating any suitable magnetic-field values of any suitable magnetic fields at any suitable locations. FIG. 6 illustrates magnetic inclination over the surface of Earth according to the US/UK WMM for 2020-2025, which is a publicly available database providing the values of the total strength of the magnetic field, magnetic inclination, and magnetic declination at locations everywhere on Earth. If one or more of these magnetic-field values are known for one or more points on a given trajectory (e.g. the city in which the measurements are being collected), then in particular embodiments those values can be incorporated to detect and reduce or even minimize one or more effects of magnetic anomalies on heading calculations, thereby improving electronic-compass accuracy. In particular embodiments, a trajectory is a continuous three-dimensional or two-dimensional path in space. A path may be a continuous series of positions or configurations that may be assumed in a motion or process of change by a moving or varying system (such as a device). Herein, reference to a trajectory may include a symbolic or graphical representation of the trajectory, data associated with the trajectory (such as one or more magnetic or other recordings corresponding to the trajectory), or both, and vice versa, where appropriate.

Particular embodiments of the calibration-coefficient algorithm may adjust all three components of a magnetic sensor's readings to facilitate calibrated measurement of the total magnetic field remaining closer to one or more known magnetic-field values for the location. This may be achieved by calculating a set of calibration coefficients that correct for offsets and scale factors. When applied to raw measurements, these coefficients may facilitate more accurate determination of heading or other location information.

Particular embodiments of the calibration-coefficient algorithm include an iterative process that filters out erroneous magnetic-field readings or measurements influenced by anomalies and performs optimization on more reliable data sets. The process may diverge as it runs. For example, the shift or scale factors may start to produce larger errors relative to one or more target or expected magnetic-field values (which may be determined based on an available magnetic-field map covering that region, such as, for example, the US/UK WMM for 2020-2025, the EMM, the IGRF model, or the EMAG2 model). If the process diverges, then it may be stopped and, in particular embodiments, rerun after a period of time (which may be a predefined or predetermined amount of time). For an individual magnetic sensor, increasing the number of iterations may enhance accuracy. However, for a particular model or type of magnetic sensor, an optimal number of iterations may be determined experimentally or otherwise predefined or predetermined. The calibration coefficients identified may then be universally applied to all magnetic sensors of the same model or type. In addition or as an alternative, one or more predefined or predetermined threshold values may be used to determine when to stop the process. These values may be experimentally determined. With each iteration of the process, the calculated error or minimums may be compared with those values and, if the calculated error or minimums reach or come within a predefined or predetermined amount of those values, then the process may be stopped. In particular embodiments, it may take 11, 12, or another number of iterations of the process to reach or come within the predefined or predetermined amount of those values. Herein, reference to a process may include one or more iterations of the process, and vice versa, where appropriate.

Examples of conventional calibration techniques for magnetic sensors include sphere fitting, ellipsoid fitting, simplified hard-iron distortion removal, and aero-magnetic compensation. In particular embodiments, sphere fitting may involve fitting a magnetic sensor's raw measurements to a sphere without substantial loss in accuracy. Sphere fitting may find three values (e.g. three hard-iron distortion coefficients or a vector of three shifts) and then subtract them from the raw measurements to produce calibrated measurements. If plotted in three-dimensional space, the calibrated field components may form a sphere with its center at (0,0,0) and its radius equal to the magnitude of the measured magnetic field. In particular embodiments, sphere fitting may transform raw measurements from an offset ellipsoid into a corrected sphere.

In particular embodiments, sphere fitting to calibrate a magnetic sensor may be performed as follows. First, raw measurements (e.g. $B_x$, $B_y$, and $B_z$) may be collected from the magnetic sensor while the magnetic sensor (or a device that the magnetic sensor is in) is rotated through all possible orientations. Herein, with respect to the motion of an object (such as a device or a component of a device), rotation may, as appropriate, refer to movement of the object around a fixed axis or a central point in which different points on or in the object follow substantially circular paths about the axis of rotation. Moreover, translation may, as appropriate, refer to movement of the object in which all points of the object move substantially the same distance in substantially the same direction without significant rotation or deformation, which may be a type of rigid body motion in which the object's orientation remains substantially unchanged. In addition or as an alternative, as appropriate, translation may refer to movement of the center of the object. Furthermore, general motion or combined motion may, as appropriate, refer to movement of the object in which the object translates and rotates. For example, because a wheel or ball rolling on the ground is both translating (e.g. its center is moving) and rotating (e.g. spinning around its axis), it may be considered to be undergoing general or combined motion. Herein, reference to rotation may include translation or combined motion, or both, and vice versa, where appropriate.

Next, after raw measurements are collected, a sphere may be calculated that best fits the raw measurements in terms of least squares. This sphere may minimize the squared distances between the sphere's surface and the data points representing the raw measurements. The following may be the equation for that sphere:

$$(B_x - b_x)^2 + (B_y - b_y)^2 + (B_z - b_z)^2 = R^2, \tag{5}$$

where $b_x$, $b_y$, and $b_z$ represent the bias (or offset) of the magnetic sensor and R is the radius of the sphere. The sphere may be found using a linear least squares solution (e.g. the Delogne-Kåsa method for fitting circles), nonlinear least squares solution (e.g. the Gauss-Newton or Levenberg-Marquardt algorithm), or another suitable solution. The result may be a bias vector $(b_x, b_y, b_z)$ that may be subtracted from the magnetic sensor's raw measurements to generate calibrated measurements. For example, if the best-fit sphere is centered at $(+30, -5, +10)$ in $\mu T$, then those values may be subtracted from $B_x$, $B_y$, and $B_z$, respectively, in raw measurements measured in $\mu T$ to recenter the measurements to $(0, 0, 0)$.

In particular embodiments, if the magnitude (or strength) of the GMF or other magnetic field at the location where the magnetic sensor is being calibrated is known (e.g. from a current version of the WMM, EMM, IGRF, or EMAG2), then the radius of the best-fit sphere may be scaled to that known value. For example, if sphere fitting performed at a location produces a best-fit sphere with a radius of 50 $\mu T$ and the magnitude of the GMF at that location is known to be 48 $\mu T$, then raw measurements from the magnetic sensor may be uniformly scaled by the ratio 48/50 in addition to the bias vector $(b_x, b_y, b_z)$ being subtracted from the raw measurements to generate calibrated measurements. Although particular sphere fitting is described or illustrated herein, this disclosure contemplates any suitable sphere fitting.

Sphere fitting, while simpler, may correct only for bias and, in some cases, scaling error. It may assume any distortion is isotropic (e.g. the same along all axes) and provide one global scale factor, if any. Sphere fitting may not correct for soft-iron or other distortion, axis misalignment, or axis-specific gain error or non-orthogonality. In contrast, ellipsoid fitting may account for distortion, providing cross-coupling and a different scale factor along each axis, resulting in more accurate calibration. In particular embodiments, ellipsoid fitting may involve finding a best-fit ellipsoid that a magnetic sensor's raw measurements cluster around (e.g. the coefficients of the equation of an ellipsoid that best fit the magnetic sensor's raw measurements). In particular embodiments, this process may produce a 3×3 matrix and a 3×1 vector. The matrix may help to correct soft-iron distortion, and the diagonal components of the matrix may be the gain coefficients of the axes of the magnetic sensor. The vector may be a hard-iron-bias vector.

In particular embodiments, ellipsoid fitting to calibrate a magnetic sensor may be performed as follows. First, raw measurements (e.g. $B_x$, $B_y$, and $B_z$) may be collected from the magnetic sensor while the magnetic sensor (or a device that the magnetic sensor is in) is rotated through all possible orientations. Next, an ellipsoid may be calculated that best fits the raw measurements in terms of least squares. This ellipsoid may minimize the squared distances between the ellipsoid's surface and the data points representing the raw measurements. The following may be the equation for that ellipsoid:

$$AB_x^2 + BB_y^2 + CB_z^2 + DB_xB_y + \tag{6}$$

$$EB_xB_z + FB_yB_z + GB_x + HB_y + IB_z + J = 0,$$

where A, B, and C are the quadratic coefficients along the axes of the ellipsoid; D, E, and F are cross-terms indicating the tilt or rotation of the ellipsoid; G, H, and I are linear terms indicating the center of the ellipsoid (or how far the ellipsoid is shifted away from the origin); and J is a constant term. The best-fit ellipsoid may be found using a linear least squares solution (e.g. the Delogne-Kåsa method for fitting circles), nonlinear least squares solution (e.g. the Gauss-Newton or Levenberg-Marquardt algorithm), or another suitable solution. In particular embodiments, to do this, a data matrix may be constructed with a row for each raw measurement ($B_x$, $B_y$, $B_z$) as follows:

$$M = \begin{bmatrix} B_{x_1}^2 & B_{y_1}^2 & B_{z_1}^2 & 2B_{x_1}B_{y_1} & 2B_{x_1}B_{z_1} & 2B_{y_1}B_{z_1} & 2B_{x_1} & 2B_{y_1} & 2B_{z_1} & 1 \\ B_{x_2}^2 & B_{y_2}^2 & B_{z_2}^2 & 2B_{x_2}B_{y_2} & 2B_{x_2}B_{z_2} & 2B_{y_2}B_{z_2} & 2B_{x_2} & 2B_{y_2} & 2B_{z_2} & 1 \\ \vdots & \vdots & \vdots & \vdots & \vdots & \vdots & \vdots & \vdots & \vdots & \vdots \\ B_{x_N}^2 & B_{y_N}^2 & B_{z_N}^2 & 2B_{x_N}B_{y_N} & 2B_{x_N}B_{z_N} & 2B_{y_N}B_{z_N} & 2B_{x_N} & 2B_{y_N} & 2B_{z_N} & 1 \end{bmatrix}. \tag{1}$$

The coefficient vector may be p=[A,B,C,D,E,F,G,H,I,J]$^T$, and the equation to be solved may be Mp=0. Singular value decomposition (SVD) or another least-squares minimization may be used to solve for p.

Next, after the parameters of the ellipsoid are solved for, the center of the ellipsoid ($b_x$,$b_y$,$b_z$) may be determined. The center of the ellipsoid may correspond to the bias (or offset) in the magnetic sensor and may be found by solving the following equation:

$$\begin{bmatrix} b_x \\ b_y \\ b_z \end{bmatrix} = -|A|^{-1}|A_{1:3,4}|, \tag{8}$$

where $$A = \begin{pmatrix} A & D/2 & E/2 & G/2 \\ D/2 & B & F/2 & H/2 \\ E/2 & F/2 & C & I/2 \\ G/2 & H/2 & I/2 & J \end{pmatrix}. \tag{9}$$

To find the soft-iron distortions, the following translation matrix may be found:

$$T = \begin{pmatrix} 1 & 0 & 0 & 0 \\ 0 & 1 & 0 & 0 \\ 0 & 0 & 1 & 0 \\ b_x & b_y & b_z & 1 \end{pmatrix}. \tag{10}$$

Then, $$R = T \times |A| \times T^T. \tag{11}$$

The eigen vector and eigen-values problem may then be solved as follows:

$$[evecs, \, evals] = eig(R_{1:3,1:3}^{-1} \times -R_{4,4}). \tag{12}$$

The radii of the ellipsoid may be found as follows:

$$radii = \sqrt[2]{\frac{1}{diag(evals)}}, \tag{13}$$

where diag indicates taking only diagonal elements of the matrix. The correction coefficients for the ellipsoid radii may then be found as follows:

$$CorrectCoeffs = \frac{radii}{(radii_1 \times radii_2 \times radii_3)^{1/3}} \tag{14}$$

The soft-distortion correction matrix may then be found as follows:

$$M = R^T \times \begin{bmatrix} \dfrac{1}{CorrectCoeffs} & 0 & 0 \\ 0 & \dfrac{1}{CorrectCoeffs} & 0 \\ 0 & 0 & \dfrac{1}{CorrectCoeffs} \end{bmatrix} \times R. \tag{15}$$

The calibrated magnetic field may then be as follows:

$$B_{calibrated} = M \times (B_{raw} - B_{offset}), \tag{16}$$

where $$B_{offset} = \begin{bmatrix} b_x \\ b_y \\ Z \end{bmatrix}. \tag{17}$$

Thus, in particular embodiments, ellipsoid fitting may involve the following steps: (1) collecting raw magnetic-sensor data by rotating in all orientations; (2) fitting the ellipsoid equation using least-squares on Mp=0; (3) solving for the best-fit ellipsoid coefficients; (4) extracting the ellipsoid center (hard-iron bias); (5) computing the soft-iron correction matrix from the quadratic matrix; and (6) applying calibration transformation to correct new readings. This may transform the distorted ellipsoid back into a sphere with the correct scale. The computed bias vector and transformation matrix may be stored and applied to new raw measurements in real-time or post processing to correct the raw measurements and generate corresponding calibrated measurements. Although particular ellipsoid fitting is described or illustrated herein, this disclosure contemplates any suitable ellipsoid fitting.

Another conventional calibration technique is simplified hard-iron-distortion removal. In particular embodiments, simplified hard-iron-distortion removal to calibrate a magnetic sensor in a device may be performed as follows. First, raw measurements (e.g. $B_x$, $B_y$, and $B_z$) may be collected from the magnetic sensor while the magnetic sensor (or a device that the magnetic sensor is in) is rotated through all possible orientations. Next, hard-iron bias may be identified and corrected for. To do this, the center of the raw measurements may be found by calculating the midpoints between the minimum and maximum measured values for all recorded values for $B_x$, $B_y$, and $B_z$ as follows:

$$B_{offset} = \left( \frac{\max(B_x) + \min(B_x)}{2}, \frac{\max(B_y) + \min(B_y)}{2}, \frac{\max(B_z) + \min(B_z)}{2} \right). \tag{18}$$

The offset vector $B_{offset} = (b_x, b_y, b_z)$ may represent the hard-iron bias and correspond to the ellipsoid's center. For example, if along the x axis the measurements ranged from +40 μT to −10 μT, then the calculated hard-iron bias along the x axis may be $$\frac{40 + (-10)}{2} = +15.$$

As an alternative, a sphere may be fitted to the data to find the center. However, using the midpoint method above tends to be simpler and is often effective. However calculated, the offset vector $B_{offset} = (b_x, b_y, b_z)$ may be subtracted from every raw measurement $\tilde{m} = (\tilde{m}_x, \tilde{m}_y, \tilde{m}_z)$ to correct for hard-iron bias as follows:

$$m' = \approx -B_{offset} = (\tilde{m}_x - b_x, \tilde{m}_y - b_y, \tilde{m}_z - b_z). \tag{19}$$

With this operation, the average of the calibrated measurements along each axis may be zero and, if plotted, the points representing those measurements may be approximately centered at the origin.

Next, soft-iron distortion may be identified and corrected for. To identify and correct for soft-iron distortion, the ellipsoid may be transformed into a sphere using a 3×3 transformation matrix. One method for determining the transformation matrix is axis scaling. Another is ellipsoid fitting. In the simpler case (axis scaling), the transformation matrix may be a diagonal matrix with entries $s_x, s_y, s_z$ on the diagonal (and zeros off-diagonal if there is no cross-coupling). In the more general case (ellipsoid fitting), the transformation matrix may be a full 3×3 matrix. For better calibration, applying the full 3×3 matrix to the offset-corrected measurements m' may produce calibrated measurements that lie on a sphere with a radius equal to the Earth's magnetic field strength at the location of the calibration. Returning to the simpler case, if the Earth's magnetic field strength is not known, then the calibrated measurements may lie on a sphere of some radius, which may be normalized or equal to the average magnitude of the raw measurements. For greater accuracy, the transformation matrix may subsequently be scaled so that the sphere's radius matches a known field strength.

After the offset vector $B_{offset} = (b_x, b_y, b_z)$ and the transformation matrix have been calculated, raw measurements may be converted to calibrated measurements using that vector and matrix. The following formula may be used:

$$B_{calibrated} = C(B_{raw} - B_{offset}), \tag{20}$$

where C is the transformation matrix. The following is that formula in an expanded form:

$$\begin{bmatrix} B_{calibrated_x} \\ B_{calibrated_y} \\ B_{calibrated_z} \end{bmatrix} = C \begin{bmatrix} B_{raw_x} - b_x \\ B_{raw_y} - b_y \\ B_{raw_z} - b_z \end{bmatrix}. \tag{21}$$

In implementation, for each new raw measurement, the offset may be subtracted from the raw measurement and the difference may be multiplied by the transformation matrix, with the result being a calibrated measurement. In the case of axis scaling, the transformation matrix may be diagonal (e.g. $C_{xx} = s_x$, $C_{yy} = s_y$, $C_{zz} = s_z$, with off-diagonals=0). In the case of ellipsoid fitting, the transformation matrix may have off-diagonal terms accounting for axis misalignments. After applying this transform, the magnetic sensor may be calibrated, with hard-iron bias and soft-iron distortion substantially corrected for and calibrated measurements being more accurately aligned with the true magnetic field. Although particular simplified hard-iron-distortion removal is described or illustrated herein, this disclosure contemplates any suitable simplified hard-iron-distortion removal.

Conventional techniques for calibrating a magnetic sensor may work well enough under ideal circumstances, with nothing influencing or distorting the GMF (or other magnetic field being measured by the magnetic sensor). However, such circumstances tend to exist only in open spaces, such as open ocean or high in Earth's atmosphere, away from Earth's crust and away from buildings or other factors influencing or distorting the GMF. Therefore, measurements by a magnetic sensor calibrated using only a conventional calibration technique may be negatively affected by magnetic anomalies encountered by the magnetic sensor (e.g. generated by metal nearby) or other environmental factors when the magnetic sensor is used for navigation.

To address these problems, a calibration-coefficient algorithm may be used to optimize calibration coefficients for the magnetic sensor. The algorithm may assume that the magnetic sensor has already been calibrated using a conventional calibration technique, for example, at the time of manufacture. In addition or as an alternative, the magnetic sensor may be calibrated using a conventional calibration technique before the magnetic sensor is calibrated further using the calibration-coefficient algorithm. The algorithm may begin with raw measurements of a magnetic field being collected by the magnetic sensor. The raw measurements to be used in the calibration-coefficient algorithm may be collected before the magnetic sensor (or a device containing the magnetic sensor) is used for navigation or when the magnetic sensor (or the device containing it) is otherwise not being used for navigation. For example, the raw measurements may be collected during installation, configuration, initialization, provisioning, or other set up of the device. In addition or as an alternative, the raw measurements to be used in the calibration-coefficient algorithm may be collected while the magnetic sensor is being used for navigation. For example, in the case of a vehicle containing the magnetic sensor, the raw measurements may be collected while the vehicle is being driven or piloted (autonomously or by a human operator) and the magnetic sensor is being used for navigation of the vehicle.

The raw measurements may, but need not necessarily, be collected while the magnetic sensor (or a device that the magnetic sensor is in) is rotated, translated, or both (e.g. in combined motion). The magnetic sensor may be rotated or translated substantially chaotically or in a more orderly manner. For example, for some or all of the raw measurements, the magnetic sensor may be rotated through all possible (or a subset of all possible) orientations while not being (or being only minimally or negligibly) translated. In addition or as an alternative, for some or all of the raw measurements, the magnetic sensor may be translated within a region while not being (or being only minimally or negligibly) rotated. In addition or as an alternative, for some or all of the raw measurements, the magnetic sensor may be rotated through all possible (or a subset of all possible) orientations while being translated within a region. This may include the magnetic sensor being translated, e.g., within a square measuring 10 meters by 10 meters in a trajectory that starts and stops at the same point, such as by a person walking with a smartphone or other device containing the magnetic sensor. In addition or as an alternative, this may include the magnetic sensor being spun around a single point, such as by a person standing in a spot and spinning around while holding a smartphone or other device containing the magnetic sensor. Regardless of when or how the raw measurements are collected, collecting them when there are fewer magnetic disturbances or anomalies present may result in more accurate, precise, or reliable calibration coefficients.

After being collected, the raw measurements may be processed as follows (which may be done in whole or in part by the magnetic sensor, by a device that contains the magnetic sensor, or by another device that does not contain the magnetic sensor). The magnetic field may be represented in the vector form $M=[M_x,M_y,M_z]^T$, where $M_x,M_y,M_z$ are the measured components $B_x$, $B_y$, $B_z$ of the magnetic field. Effects of magnetic anomalies or other environmental factors on the magnetic sensor may be offset by determining changes to the magnitudes of $M_x,M_y,M_z$ that approach target or expected magnitudes for the location where the raw measurements were collected. Those target or expected magnitudes may be determined based on an available magnetic-field map that includes that location, such as, for example, a current version of the WMM, EMM, IGRF, or EMAG2. The target magnitudes $T_m$ may be determined as follows:

$$T_m = \sqrt{M_x^2 + M_y^2 + M_z^2}. \tag{22}$$

The vector of the compensated magnetic field may then be determined using the following expression:

$$M^\wedge = \left[M_x^\wedge, M_y^\wedge, M_z^\wedge\right]^T = [\alpha_x(M_x - \beta_x), \alpha_y(M_y - \beta_y), \alpha_z(M_z - \beta_z)]^T, \tag{23}$$

(24) $\tau_x, \alpha_y, \alpha_z$ are scaling parameters and $\beta_x, \beta_y, \beta_z$ are shift parameters. To determine these scaling and shift parameters more accurately, the following optimization problem may be solved:

$$J(\alpha_x, \alpha_y, \alpha_z, \beta_x, \beta_y, \beta_z) =$$
$$\sum_{i=1}^{n} \left((\alpha_x(M_{ix} - \beta_x))^2 + (\alpha_y(M_{iy} - \beta_y))^2 + (\alpha_z(M_{iz} - \beta_z))^2 - T_m^2\right)^2.$$

Equation 24 is a least-squares error function and may be calculated with different scaling and shift parameters as the process iterates. In equation 24, J is the error to be minimized; $\alpha_x, \alpha_y, \alpha_z$ and $\beta_x, \beta_y, \beta_2$ are the set of scaling and shift parameters that the error is being calculated for; n is the number of raw measurements (or samples) that the error is being calculated for; $M_{ix}, M_{iy}, M_{iz}$ are the measured x, y, z components of the magnetic-field in sample i; and $T_m$ is the target or expected true magnetic-field magnitude, which may be substantially constant for all samples. Although a particular least-squares error function is described or illustrated herein, this disclosure contemplates any suitable least-squares error function.

The above approach may work well when raw measurements are collected in more open regions. However, in other conditions (which may be more common or realistic), it may be advantageous to filter out raw measurements influenced by local magnetic anomalies. To do this, the following example dynamic scaling and weighted adjustment may be used:

$$\text{Dynamic scaling: scale}_i = \tag{25}$$

$$\text{scale}_{i-1} + \Delta\text{scale}_{i-1}\left(\frac{1}{1 + \exp(-\varphi(|M_{i-1}| - T_m))}\right)$$

$$\text{Weighted adjustment: } \omega_i = \frac{1}{1 + \exp\left(-\lambda\left(\frac{1}{n}\sum_{j=1}^{n}\cos\theta_j\right)\right)} \tag{26}$$

In equation 25, $\text{scale}_i$ is the scaling parameter for iteration i; $\text{scale}_{i-1}$ is the scaling parameter for iteration i−1; $\Delta\text{scale}_{i-1}$ is the increment from iteration i−1 to iteration i; $M_{i-1}$ is the total measured magnetic field in iteration i−1; $T_m$ is the target or expected true magnetic-field magnitude, which may be substantially constant for all samples; and $\varphi$ is a sensitivity parameter representing how sharply the scale function reacts to deviations. $\varphi$ may be determined experimentally and may be in the range of 0.2 to 0.3 or any other suitable value. In equation 26, $\omega_i$ is the weight or confidence value at iteration i; $\lambda$ is a gain parameter; n is the number of samples and represents the size of the measurement window; and $\theta_i$ is the angle between the measured vector and the reference field direction. A may be determined experimentally to provide a preferred sensitivity, such as 0.65 or any other suitable value. Although particular equations for dynamic scaling and weighted adjustment are described or illustrated herein, this disclosure contemplates any suitable equations for dynamic scaling and weighted adjustment.

The following example multi-level optimization of the displacement parameters may then be applied:

$$\min_{\beta_x,\beta_y,\beta_z}\sum_{i=1}^{n}\left((M_{ix} - \beta_x)^2 + (M_{iy} - \beta_y)^2 + (M_{iz} - \beta_z)^2\right) \tag{27}$$

$$\min_{\beta_x,\beta_y,\beta_z}\sum_{i=1}^{n}\omega_i\left((M_{ix} - \beta_x)^2 + (M_{iy} - \beta_y)^2 + (M_{iz} - \beta_z)^2\right) \tag{28}$$

$$\min_{\beta_x,\beta_y,\beta_z}\sum_{i=1}^{n}\left((M_{ix} - \beta_x)^2 + (M_{iy} - \beta_y)^2 + (M_{iz} - \beta_z)^2\right) \tag{29}$$

Equation 27 is an unweighted least-squares minimization equation, equation 28 is a weighted least-squares minimization equation, and equation 29 is a scaled least-squares minimization equation. In equations 27, 28, and 29, $\beta_x,\beta_y,\beta_z$ are the shift parameters that differences are minimized for; n is the number of raw measurements (or samples) that differences are being calculated for; $M_{ix},M_{iy},M_{iz}$ are the measured x, y, z components of the magnetic-field in sample i; $\text{scale}_i$ is the dynamic scaling from Equation 25 for sample i; and $\omega_i$ is the weighted adjustment from Equation 26 for sample i. Although particular least-squares minimization equations are described or illustrated herein, this disclosure contemplates any suitable least-squares-minimization equations.

Thus, in particular embodiments, the calibration-coefficient algorithm may involve (1) collecting raw measurements with a magnetic sensor; (2) determining target or expected magnetic-field values for the raw measurements; and (3) optimizing a set of scaling and shift parameters to calibrate the magnetic sensor by (a) determining scaling and shift parameters that substantially minimize the squared deviation between the target or expected magnetic-field values and, when significant local magnetic anomalies are present during the calibration, additionally (b) filtering out the local magnetic anomalies using dynamic scaling, weighted adjustment, and least-squares minimization. The calibration-coefficient algorithm may be iterative, with erroneous magnetic-field readings or measurements influenced by anomalies being filtered out and optimization being performed on more reliable data sets. If the process diverges (e.g. the shift or scale factors or parameters start to produce larger errors relative to the target values), then the process may be stopped and, in particular embodiments, rerun after a predefined or predetermined or other period of time. In addition or as an alternative, the process may be stopped after a predefined or predetermined number of iterations, which may be determined experimentally. In addition or as another alternative, one or more predefined or predetermined threshold values may be used to determine when to stop the process. With each iteration of the process, the calculated error or minimums may be compared with those values and, if the error or calculated minimums reach or come within a predefined or predetermined amount of those values, then the process may be stopped.

The calibration-coefficient algorithm may be used to obtain more accurate, precise, or reliable data from a magnetic sensor, which may in turn be used to obtain more accurate, precise, or reliable heading, orientation, or other location information. In addition, navigation may be performed in whole or in part using that calibrated data. In addition or as an alternative, the dynamic-parameter algorithm disclosed herein may be executed in whole or in part with that calibrated data. In addition or as an alternative, sensor fusion (which may include dynamic selection of DTW or other parameters for navigation with a magnetic-field map) may be performed in whole or in part using that calibrated data. In addition or as an alternative, geolocation information may be validated in whole or in part using that calibrated data. Although particular uses or applications of calibrated data from a magnetic sensor obtained using the calibration-coefficient algorithm are described or illustrated herein, this disclosure contemplates any suitable uses or applications of calibrated data from a magnetic sensor obtained using embodiments of the calibration-coefficient algorithm.

Particular embodiments may facilitate more accurate, precise, or reliable heading, orientation, or other location information about a device as the location or environmental conditions of the device change. For example, an electronic compass with one or more magnetic sensors may be affixed to an aircraft (e.g. an sUAS) or surface or underwater vessel (e.g. an AUV or ASV) with a particular alignment relative to the aircraft or vessel (e.g. with an arrow of the electronic compass aligned with the nose of the aircraft or bow of the vessel). As the location of the aircraft or vessel changes, the aircraft or vessel may encounter different magnetic anomalies of varying degrees. As that occurs, the magnetic sensors of the electronic compass may be calibrated or recalibrated (automatically or otherwise) using an embodiment of the calibration-coefficient algorithm disclosed herein to increase the accuracy, precision, or reliability of the magnetic sensors and the electronic compass.

This calibration or recalibration may be performed on a periodic basis or at a particular frequency or performed when certain threshold criteria are met. The period or frequency may be predefined or predetermined or determined in real time, and the threshold criteria may be one or more measurements, other values, or other signals used to determine whether or when to calibrate or recalibrate. For example, variance in the local magnetic field may be monitored and, if it reaches or exceeds a predefined or predetermined threshold within a predefined or predetermined sliding window of time, then calibration or recalibration may be initiated, automatically or otherwise. As another example, the electronic compass may be affixed to a payload-delivery system or an aiming or targeting system (e.g. with an arrow of the electronic compass aligned with an axis of the system) and calibration or recalibration of the magnetic sensor(s) of the electronic compass may be initiated (automatically or otherwise) when the system is relocated, re-aimed, or re-sighted (which may be detected automatically through the use of one or more motion or other sensors). Although particular bases or criteria are described or illustrated herein for determining whether or when to calibrate or recalibrate, this disclosure contemplates any suitable bases or criteria for determining whether or when to calibrate or recalibrate.

Conventional calibration techniques often involve collecting raw data from one or more magnetic sensors recorded in an environment with minimal or no magnetic disturbances and processing that data to obtain a set of calibration coefficients for the sensor. These techniques may be used to normalize magnetic readings across various types and models of magnetic sensors around Earth. However, in high EMI environments, applying such calibration coefficients may be inadequate in many cases for certain applications, including widely used electronic compasses. For example, an electronic compass's arrow may behave unpredictably when used indoors to try to find magnetic north. In some cases, the arrow will be off by as much as 180°.

In contrast, particular embodiments may "self calibrate" using actual, real-time raw magnetic-field values to compute calibration coefficients (e.g. using the calibration-coefficient algorithm disclosed herein), which may be particularly advantageous in environments with high EMI. For example, raw measurements for calibration of a magnetic sensor may be collected by the magnetic sensor in real time while it is being used for navigation or a device containing it is being used for its intended function or in its intended operation. Calibration coefficients for the magnetic sensor may then be computed (e.g. using an embodiment of the calibration-coefficient algorithm disclosed herein) with those raw measurements and applied to the magnetic sensor, also in real time. Such processing may be done by the magnetic sensor, by a device that contains the magnetic sensor, or by another device that does not contain the magnetic sensor. Calibration coefficients obtained this way may produce more accurate calibrated measurements or data, and this may, for example, lead to more accurate, precise, or reliable electronic-compass values. In particular embodiments, actual, real-time raw magnetic-field values may be used in this way to compute calibration coefficients for a magnetic sensor in addition or as an alternative to other raw measurements (e.g. collected during installation, configuration, initialization, provisioning, or other set up of the magnetic sensor or a device containing it) being used to compute calibration coefficients for the magnetic sensor.

Such self calibration may be done using a predefined or predetermined time window to periodically collect calibration data and apply it to current raw values. For example, an embodiment of the calibration-coefficient algorithm disclosed herein may automatically be executed on a periodic basis (which may be specified in seconds, minutes, hours, or other units of time or fractions thereof) or at a particular frequency (which may be specified in hertz) or executed when certain threshold criteria are met. The period or frequency may be predefined or predetermined or determined in real time. The threshold criteria may be one or more measurements, other values, or other signals used to determine whether or when to self calibrate. For example, variance in the local magnetic field may be monitored and, if it reaches or exceeds a predefined or predetermined threshold within a predefined or predetermined sliding window of time, then self calibration may be initiated. Although particular bases or criteria are described or illustrated herein for determining whether or when to self calibrate, this disclosure contemplates any suitable bases or criteria for determining whether or when to self calibrate.

As described above, more accurate, precise, or reliable calibration of magnetic sensors (such as, for example, using embodiments of the calibration-coefficient algorithm disclosed herein) may facilitate a variety of applications. For example, particular embodiments may facilitate the use of the magnetic inclination, magnetic declination, total strength of the magnetic field, or other information about the magnetic field at a location (possibly along with motion or orientation data (e.g. from an accelerometer or gyroscope)) to detect potential IP-address (or other IP information) or GNSS spoofing or similar deception. This may be useful to a financial institution that wants to know the geolocation of the sender of a request to the financial institution to transfer funds or execute another financial transaction. In some cases, this may be required by law. In others, this may be a policy of the financial institution, designed to reduce fraud. The financial institution may attempt to determine the geolocation of the sender by identifying the IP address that the request was sent from and then looking up the physical location associated with that IP address. However, IP masquerading, IP-address (or other IP information) spoofing, GNSS spoofing, and other techniques may be used to fool such checks. For example, inserting a "wrong" IP address into a banking request may hide the actual geolocation of the sender and indicate a false geolocation instead, circumventing that check. GNSS spoofing may include fake satellite signals being broadcast to deceive a GNSS receiver (such as GNSS receiver 206) into computing incorrect position, velocity, or time. IP-address spoofing may include forgery of a source IP address in a header of an IP packet so that the IP packet appears to come from a machine or location other than the machine or location that it actually comes from. IP masquerading may include a networking technique that allows multiple devices on a network to share a single IP address when accessing the Internet or another network. Although particular spoofing or other deception is described or illustrated herein, this disclosure contemplates any suitable spoofing or other deception.

Particular embodiments facilitate additional, independent validation of geolocation information that is more difficult to modify or spoof. In particular embodiments, this validation is based on data obtained from the GMF or other known magnetic field, including but not limited to its strength or one or more of its derivatives, such as, for example, magnetic inclination or declination. The magnetic inclination, magnetic declination, total strength of the magnetic field, or other information about the magnetic field where the sender of a communication is located may be used to confirm the sender's location or detect deceptive or fraudulent activity. In particular embodiments, this information may be used along with motion or orientation data (e.g. from an accelerometer or gyroscope), which may help to determine whether measured, calculated, or reported changes in the magnetic field are a result of movement or interference. Combining magnetic data with motion or orientation data may facilitate more accurate or reliable confirmation of the sender's location or detection of deceptive or fraudulent activity. In addition or as an alternative, combining magnetic data with motion or orientation data in this way may facilitate more accurate or reliable calibration of a magnetic sensor. Particular embodiments may build a local map of magnetic interference by collecting raw magnetic data in different places, and this map may be used to help adjust calibration depending on where the device is located during that calibration. This may be particularly useful indoors or in regions with significant EMI.

Magnetic inclination is known at various locations on Earth. For example, as described above, FIG. 6 illustrates magnetic inclination over the surface of Earth according to the US/UK WMM for 2020-2025. Magnetic inclination may be used to detect IP-information, GNSS, or other spoofing almost anywhere on Earth. For example, if a request or other communication is received from a device at an IP address associated with a location with a known magnetic-inclination value and the device reports a determined magnetic-inclination value at its location (e.g. determined by a magnetic sensor on the device) that differs from the known magnetic-inclination value at the location, then it may be determined that the device is not actually at the location associated with that IP address and the device's IP address is being spoofed. More specifically, if the location associated with the IP address is, for example, in Earth's southern hemisphere (where all magnetic-inclination values are negative) and the device reports a determined magnetic-inclination at its location value that is positive, then it may be determined that the device is not actually at that location and the device's IP address is being spoofed. This may similarly be applied to a location reported by a device's GNSS receiver, the known magnetic-inclination value at which may be compared with a determined magnetic-inclination value reported by the device. In particular embodiments, combining this use of magnetic inclination with similar use of magnetic declination or the value of the total magnetic field (or both) may increase the accuracy of the determination of whether user-provided geolocation information via IP address or other means is actually true.

Magnetic anomalies, which are present everywhere on Earth, and especially those that are indoors, which tend to be pronounced, affect the calculation of magnetic-inclination values from the x, y, and z components of the ambient magnetic field. In most cases, conventional techniques or formulas for such calculations tend to yield unreliable results. In particular embodiments, with more accurate calibration of magnetic sensors, the effects of such anomalies may be reduced such that calculation of magnetic-inclination values from the x, y, and z components of the ambient magnetic field will be significantly more accurate, precise, or reliable. For example, particular embodiments may facilitate calculations of magnetic-inclination or other magnetic-field values that are accurate to within one degree, for example, of those provided by the US/UK WMM for 2020-2025.

Particular embodiments include a dynamic-parameter algorithm that facilitates dynamic selection of DTW or other parameters (or values for those parameters) for navigation with a magnetic-field map. Herein, reference to a parameter may include its category (e.g. window or window_min) or value (e.g., 4 or 24) and vice versa, where appropriate. Moreover, reference herein to a parameter may include a set of one or more parameters, and vice versa, where appropriate. In particular embodiments, DTW is a warping algorithm that deforms or stretches a time or other axis of a sequence or set to align features of that sequence or set with another sequence or set. For example, DTW may be used to adjust points or other features of a magnetic recording to coincide with or match (at least approximately) corresponding points or other features of another magnetic recording in whole or in part. As another example, DTW may be used to adjust points or other features of a magnetic recording to coincide with or match (at least approximately) one or more corresponding points or other features of a magnetic-field map, which may facilitate navigation with the magnetic-field map. In addition or as an alternative to parameters for DTW, particular embodiments may facilitate dynamic selection of parameters for correlated optimized warping (COW), derivative dynamic time warping (DDTW), weighted dynamic time warping (WDTW), soft dynamic time warping (soft-DTW), global alignment kernel (GAK), edit distance with real penalty (ERP), longest common subsequence (LCSS), time-warp edit distance (TWED), or any other suitable warping algorithm. In addition or as an alternative to parameters for warping algorithms, particular embodiments may facilitate dynamic selection of parameters for particle filtering or any other suitable filtering algorithm.

In particular embodiments, the dynamic-parameter algorithm is run with a magnetic-field map and a sample magnetic recording as input and determines different DTW or other parameters for different portions (or subdivisions) of the magnetic-field map, which may be dynamically selected later during navigation with the magnetic-field map. For example, one parameter or set of parameters may be determined for the entire area or volume (or extent) of the magnetic-field map and one or more other parameters or sets of parameters may be determined for one or more subdivisions (e.g. tiles) of the magnetic-field map. Example parameters include weighted time distance (WTD) or a Euclidean or other distance metric; a warping constraint (e.g., minLen or warping_window); a window constraint or starting-column index score (e.g. window, window_min, or cols start); a normalization rule; a path constraint or step pattern; an error metric or threshold; a sampling parameter; or a runtime constraint. In addition or as an alternative, other example parameters include a Kalman-filter or Bayesian-optimizer score or other setting. Although particular parameters are described or illustrated herein, this disclosure contemplates any suitable parameters. Definitions for those subdivisions and their corresponding DTW or other parameters may be output and added or linked to or otherwise associated with the magnetic-field map, which may facilitate dynamic selection of those parameters during navigation with the magnetic-field map.

The magnetic-field map used as input for the dynamic-parameter algorithm may cover a two- or three-dimensional region and include data representing magnetic-field values that correspond to points or locations in that region. That data may be organized as a relational or other database and recorded in a.bin or other file. The sample magnetic recording used as input may include data representing a time or distance series of magnetic measurements made along a trajectory in the region covered by the magnetic-field map, and that data may be formatted as CSV. The magnetic sensor(s) that made those magnetic measurements may have been calibrated using an embodiment of the calibration-coefficient algorithm disclosed herein, and the sample magnetic recording may include one or more sample magnetic recordings or a portion of a sample magnetic recording. The dynamic-parameter algorithm may be separated into two algorithms: (1) DTW_api_test and (2) DTW_results_optimize. The DTW_api_test algorithm may take as input the magnetic-field map and sample magnetic recording and output testing results, which may be formatted as CSV. The DTW_results_optimize algorithm may take those testing results as input and output a list of DTW parameter sets, which may be recorded in a JSON file. One of the DTW parameter sets may work best (e.g. produce the best results) across the extent of the magnetic-field map, and others may work best in specific subdivisions of the magnetic-field map. Those subdivisions may be defined by x, y or other intervals that can be applied within the magnetic-field map. In particular embodiments, the DTW_api_test algorithm integrates the DTW_results_optimize algorithm, taking as input the magnetic-field map and sample magnetic recording and outputting the list of DTW parameter sets. Although a particular algorithm for dynamic selection of particular parameters is described or illustrated herein, this disclosure contemplates any suitable algorithm for dynamic selection of any suitable parameters.

After the DTW_api_test algorithm receives the magnetic-field map and sample magnetic recording, it may smooth the magnetic recording according to the sampling rate of the magnetic-field map (e.g., six hertz or 10 hertz) and compare one or more points of the sample magnetic recording with the magnetic-field map using DTW. Initially, a non-Kalman query may be used to estimate positions and, once enough high-quality matches are found (e.g. below a score threshold), a Kalman filter may be activated. The Kalman filter may be used to refine the results using motion prediction and filtering. For every query using the Kalman filter, the following may be recorded: x, y coordinates, DTW score, Kalman quality (e.g. 1=good), parameter-value pair (e.g. window, window_min), and distance error (e.g. the difference between estimated and known positions). The results may then be saved to a test-result file, which the DTW_results_optimize algorithm may load into Pandas DataFrames. The DTW_results_optimize algorithm may calculate for each pair of parameters a percentage of "working" samples with kalman_quality=1 and distance error<20 feet. The parameter pair that yields the highest working percentage globally across the magnetic-field map may then be identified, and outliers (e.g. subdivisions of the magnetic-field map defined by x, y intervals) where the global parameters perform poorly may be found. For each outlier, the best local parameter pair may be computed using the same method. Sanity checks may be run to ensure that the local parameter pairs actually improve results. Optionally, the sensitivity of the results to warping_window may also be tested.

Instead of the above brute-force approach of testing all parameter combinations, Bayesian optimization with Gaussian processes may be used through a skopt.gp_minimize( ) or similar function. Each iteration of the function may evaluate a specific parameter pair and returns its working percentage, and an acquisition function may balance exploring new parameter regions with exploiting known good ones. The optimization may continue until the best combination and corresponding outlier regions are found. During optimization, test results may be grouped by spatial coordinates by x, y and parameter values and subdivisions of poor performance (e.g. sequences of points where the global best parameters underperform) may be calculated. These subdivisions may form rectangular map intervals (e.g. $x_1$-$x_2$, $y_1$-$y_2$) and, for each subdivision, an alternative parameter pair may be identified that maximizes local performance.

With either the brute-force approach or Bayesian optimization with Gaussian processes, the global and local best parameter sets may be output to a JSON or other file linking each x, y subdivision of the magnetic-field map to its optimal DTW configuration for real-time selection during navigation. The magnetic-field map may be updated with subdivision-tagged parameter sets from the JSON or other file. During navigation with the magnetic-field map, the device using the magnetic-field map may dynamically select the best parameter set depending on the device's current x, y in the magnetic-field map. This may provide adaptive performance, e.g., wider windows or different Kalman noise levels in magnetically noisy regions.

More specifically, the DTW_api_test and DTW_results_optimize algorithms may be run as follows:

(A) In a command line or subprocess, DTW_api_test is invoked with a magnetic-field map and sample magnetic recording as inputs. Other parameters for the algorithm may include-kalman_cold_start, which may represent a score threshold needed to initialize the Kalman filter (as described below), and -speedy, which may change internal variables to speed up the algorithm, potentially at the cost of completeness. Particular embodiments may also include a switch to choose between a simpler option for comprehensive testing and a more complex Bayesian optimization, as described below.

(B) A 21×21 grid of the DTW parameters window and window_min is generated with values ranging from four to 24. A testing function is then applied to this grid. What follows is one of two options: (C) a more comprehensive iterative set of tests performed on the whole grid or (D) more selective testing with Bayesian optimization in which the grid is defined as a search space and a probabilistic model is used to navigate the search space and find optimal parameters.

(C) The more comprehensive testing may be performed as follows:

(1) For each pair of window and window_min parameters, a testing function is run as follows:

(a) The input magnetic-field map is read.

(b) The sample magnetic recording is read. Specifically, in particular embodiments, the filename, header, columns representing magnetic readings, columns representing relative distance within the magnetic-field map, and a column of timestamps are read.

(c) The sample magnetic recording is smoothed based on the sampling rate of the magnetic-field map.

(d) The sample magnetic recording is iteratively compared with the magnetic-field map. This may begin with a non-Kalman-based query function. For each point of the sample magnetic recording, the query function may output a similar point in the magnetic-field map with a DTW quality score, with a lower score representing higher quality.

(e) When a sufficient number of points with scores below a certain threshold has been found, a Kalman filter is initiated and the algorithm starts using a Kalman-based query function, outputting for each point in the sample magnetic recording a Kalman quality as well as its DTW score.

(f) The x, y, DTW score, Kalman quality, pair of window and window_min values, and the squared distances between points in the sample magnetic recording and their corresponding points in the magnetic-field map are saved as test results formatted as CSV.

(2) The DTW_results_optimize algorithm takes the test results and uses Pandas DataFrames (which may be two-dimensional, labeled data structures used in Python for storing, organizing, or analyzing data) to reduce the parameters to the "best" results as follows:

(a) A percentage of "working" samples for each of the 441 parameter pairs is calculated. A working sample may be defined as a sample with a Kalman quality of "1" and a distance error of less than, e.g., 20 feet. This distance error may be based on the squared distances mentioned above.

(b) The pair of window and window_min values that produces the greatest percentage of working samples throughout the extent of the magnetic-field map is found. This may done using a fast Pandas groupby( ) function to separate the samples into groups based on a set of conditions. The lengths of the groups may then be compared with each other to determine the percentage of working samples. For example, samples may be separated into a group based on their parameter values and samples in the group that fit the definition of "working" may be further separated into another group. The lengths of these two groups may then be compared with each other to find a working percentage.

(c) The above group of samples is searched for outliers, e.g., significant sequences of samples within the group that do not fit the definition of "working." This may allow rectangular areas to be found within the magnetic-field map where the found parameters do not produce the best result.

(d) A set of optimal parameters is then found for each outlying area by running the same grouping function on the outlying groups. Sanity checks may also be run to confirm that these new "best" parameters are better than the original "best" parameters for each area. Additional sanity tests may also be run on the warping_window parameter, rerunning the testing algorithm and changing warping_window by a factor of five or another factor.

(D) As an alternative to the more comprehensive testing in (C) above, more selective testing with Bayesian optimization may be performed as follows:

(1) The 21×21 grid remains the same, but is also be defined as a "parameter space" or "search space."

(2) The functions in (C)(1) and (C)(2) above are merged into one black-box function, which may be referred to as an objective function. Each run of the testing function on a pair of parameters outputs a single numeric result of working percentage throughout the extent of the magnetic-field map.

(a) Step (C)(1) above remains the same, except a version of step (C)(2) above is run after every iteration of (C)(1) above.

(b) Step (C)(2) above is modified to produce a working percentage for one input pair of parameters and return it immediately. This working percentage is based on results across the extent of the magnetic-field map. The same function for grouping and counting is used. The current best result is tracked globally, and a set of x and y ranges defining any outlying areas inside the best result are kept in a dict (or dictionary) that may be referred to as "outliers."

(c) The returned working percentage is negated (e.g. multiplied by −1) because the Bayesian optimization function that is used is a minimization.

(3) Using the scikit-optimize (skopt) library, the following is run through the skopt.gp_minimize( ) function to use Bayesian optimization with Gaussian processes:

```
result=gp_minimize (
    func=run_api_test,
    dimensions=parameter_space,
    acq_func="EI",
    acq_func_kwargs={"xi": 0.01},
    n_initial_points=5,
    n_calls=30,
    random_state=1234
)
```

In this function, run_api_test is the function described in step (D)(2) above; parameter_space is the grid described in steps (D)(1) and (B) above; the acquisition function is EI ("expected improvement"), which may more efficiently balance exploring new parameter regions and exploiting known ones and prioritize evaluating points in the search space that are more likely to give significant improvement over the current best; xi controls how much improvement over the previous best values is desired (a smaller xi may be safer when evaluations are more expensive but it may optionally be increased if early convergence to a local optimum is seen and exploring the search space more is desired); n_initial_points represents the number of evaluations used to initialize the Gaussian Process model (five may be a good enough minimum for a 21×21 grid and it may be advantageous to keep this value smaller to avoid unnecessary calls on this function but it may be optionally increased); n_calls is the number of evaluations of the function before it comes to a conclusion (it may be desirable to keep the number of calls to a minimum (e.g. 30) but it may be increased); gp_minimize is based on a level of randomness; and random_state sets the seed for the internal number generator and it may be set to a particular number to control the randomness for reproducibility and to facilitate the system being more deterministic.

(4) The above function returns a skopt. OptimizeResult object that includes the best pair of parameters, their working percentage, and the other pairs of parameter and working percentages that the model produced, e.g., how the model explored the search space.

(5) The more detailed results are saved in a global dictionary. Similar to step (C)(2)(d) above, any outlying areas in the best results are compared with their corresponding areas in other calculated results. If other parameters yield higher working accuracies for that area, then those parameters are set as optimal for that outlying area.

For both options (C) and (D) above, the best parameters for the extent of the magnetic-field map and for the outlying areas may then be saved to a JSON file that may then be added or linked to or otherwise associated with the magnetic-field map for dynamic selection during navigation using the magnetic-field map. Although particular algorithms for determining particular DTW parameters are described and illustrated herein, this disclosure contemplates any suitable algorithms for determining any suitable DTW parameters. Moreover, this disclosure contemplates any suitable warping or filtering parameters being determined. For example, in particular embodiments, parameters for COW, DDTW, WDTW, soft-DTW, GAK, ERP, LCSS, TWED, or particle filtering may be determined in addition or as an alternative to parameters for DTW.

Thus, particular embodiments may use DTW to match (at least approximately) a sample magnetic-recording to a magnetic-field map of a region to determine different sets of DTW parameters that can be used for subsequent navigation in that region with the magnetic-field map. A global "best" parameter set may be determined for the extent of magnetic-field map and localized "best" parameter sets may be determined for specific subdivisions (e.g. x, y areas) of the magnetic-field map where different parameter values perform better. Subsequent navigation with the magnetic-field map may involve a device (such as, e.g., a device 200, 300, 400, 500, or any other suitable device) translating through the region and making a magnetic recording of its trajectory as it translates. The magnetic sensor(s) that made those magnetic measurements in the magnetic recording may have been calibrated using an embodiment of the calibration-coefficient algorithm disclosed herein, and the magnetic recording may include one or more magnetic recordings or a portion of a magnetic recording. Using DTW, the magnetic recording may be registered or otherwise aligned to the magnetic-field map by "warping" or otherwise adjusting the magnetic recording to coincide (at least approximately) with a path or other series or set of points in the magnetic-field map or identifying points in the magnetic-field map corresponding to points in the magnetic recording and then translating or otherwise adjusting the latter to coincide (at least approximately) with the former. This may occur immediately after the device translated along or while the device is still translating along the trajectory represented by the magnetic recording.

That alignment may then be used to determine a location, heading, orientation, bearing, course, track, path, trajectory, or velocity of the device. The DTW parameters used to align the magnetic recording to the magnetic-field map may be dynamically selected based on where in the magnetic-field map the magnetic recording is being aligned. As described above, the magnetic-field map may include one DTW parameter set that works best across the extent of the magnetic-field map and one or more other DTW parameter sets that each work best in a particular subdivision of the magnetic-field map. When the magnetic recording (or a portion of it) is being aligned to the magnetic-field map, it may be determined (e.g. based on location information in the magnetic recording, a recently determined location of the device, location information about the device from a fusion filter, or other location information) whether the magnetic recording corresponds to a subdivision of the magnetic-field map with a DTW parameter set specific to that subdivision (e.g. is a DTW parameter set tagged to that subdivision in the magnetic-field map). If it does, then the DTW parameter set specific to that subdivision may be used to align the magnetic recording to the magnetic-field map. If it does not, then the DTW parameter set in the magnetic-field map provided for the extent of the magnetic-field map may be used. This may be repeated as the device continues to translate through the region covered by the magnetic-field map. Although particular alignment of a particular magnetic recording to a particular magnetic-field map with particular parameter sets is described or illustrated herein, this disclosure contemplates any suitable alignment of any suitable magnetic recording to any suitable magnetic-field map with any suitable parameter sets. For example, in particular embodiments, in addition or as an alternative to the magnetic-field map including DTW parameter sets, the magnetic-field map may include parameter sets for COW, DDTW, WDTW, soft-DTW, GAK, ERP, LCSS, TWED, particle filtering, or any other suitable warping or filtering algorithm. Similarly, in particular embodiments, in addition or as an alternative to DTW being used to align the magnetic recording to the magnetic-field map, COW, DDTW, WDTW, soft-DTW, GAK, ERP, LCSS, TWED, particle filtering, or any other suitable warping or filtering algorithm may be used.

That alignment may also be used with sensor fusion including outputs from one or more other sensors or sensor systems (such as, e.g., in the case of device 200, INS 204, GNSS receiver 206, or communication interface 208) to determine a location, heading, orientation, bearing, course, track, path, trajectory, or velocity of the device. Consecutive matches and orientation determinations using DTW in this way within a predefined or predetermined (parameter) time interval may provide a direction of motion and knowing the direction of motion may facilitate determining orientation (e.g. quaternion). In addition or as an alternative, DTW may be used in this way to detect or correct for drift in a dead-reckoning algorithm when a primary system or method for navigation (such as, e.g., GNSS) is compromised. In addition or as an alternative, DTW may be used in this way even when the primary system or method for navigation is not compromised. Moreover, aligning a magnetic recording of a device to a magnetic-field map and determining a location, heading, orientation, bearing, course, track, path, trajectory, or velocity of the device with that alignment may be used as the primary system or method for navigation, even when others are available, as it may provide greater accuracy, precision, or reliability. It may also be used with or without detecting or correcting for drift in a dead-reckoning algorithm, whether as the primary or other system or method for navigation. In addition or as an alternative to DTW, one or more other warping or filtering algorithms (such as, e.g., COW, DDTW, WDTW, soft-DTW, GAK, ERP, LCSS, TWED, or particle filtering) may be used to align the magnetic recording to the magnetic-field map.

Location information may be determined at least in part by aligning a magnetic recording to a magnetic-field map using a warping algorithm (such as, e.g., DTW, COW, DDTW, WDTW, soft-DTW, GAK, ERP, LCSS, TWED, or another suitable warping algorithm) or a filtering algorithm (such as particle filtering). That location information may be used in sensor fusion with outputs from one or more other sensors or sensor systems (such as, e.g., in the case of device 200, INS 204, GNSS receiver 206, or communication interface 208) for navigation, as described above. The magnetic-field map that the magnetic recording is aligned to may include one or more sets of parameters for use with the warping or filtering algorithm and the magnetic-field map, and those sets of parameters may be generated "offline" prior to the magnetic-field map being used for navigation. This may reduce computational requirements associated with generating them in real time during navigation. These warping results may be added to the magnetic-field map (e.g. database), which may result in more useful trajectories within the database and improve the richness and quality of the magnetic-field map.

One or more of those sets of parameters may be generated using the dynamic-parameter algorithm disclosed herein. In addition or as an alternative, one or more of those sets of parameters may be generated using another suitable technique. For example, different parameters may be provided for different translation speeds. One or more parameters may correspond to a range of human walking speeds (e.g. they may have been generated within that range); one or more other parameters may correspond to a range of automobile speeds on public roads; one or more other parameters may correspond to a range of commercial-airplane speeds; and so on. To align to the magnetic-field map a magnetic recording generated at a particular translation speed, one or more parameters in the magnetic-field map corresponding to that translation speed may be selected. Although particular parameters for particular conditions are described or illustrated herein (e.g. for different subdivisions of a magnetic-field map or for different translation speeds), this disclosure contemplates any suitable parameters. If there are multiple sets of coefficients in the magnetic-field map, then one of the sets of coefficients for use in aligning a magnetic recording to the magnetic-field map may be dynamically selected in real time during navigation with the magnetic-field map. That selection may be based on where in the magnetic-field map the magnetic recording is being aligned, a velocity associated with the magnetic recording, or any other suitable basis.

Figure 7:
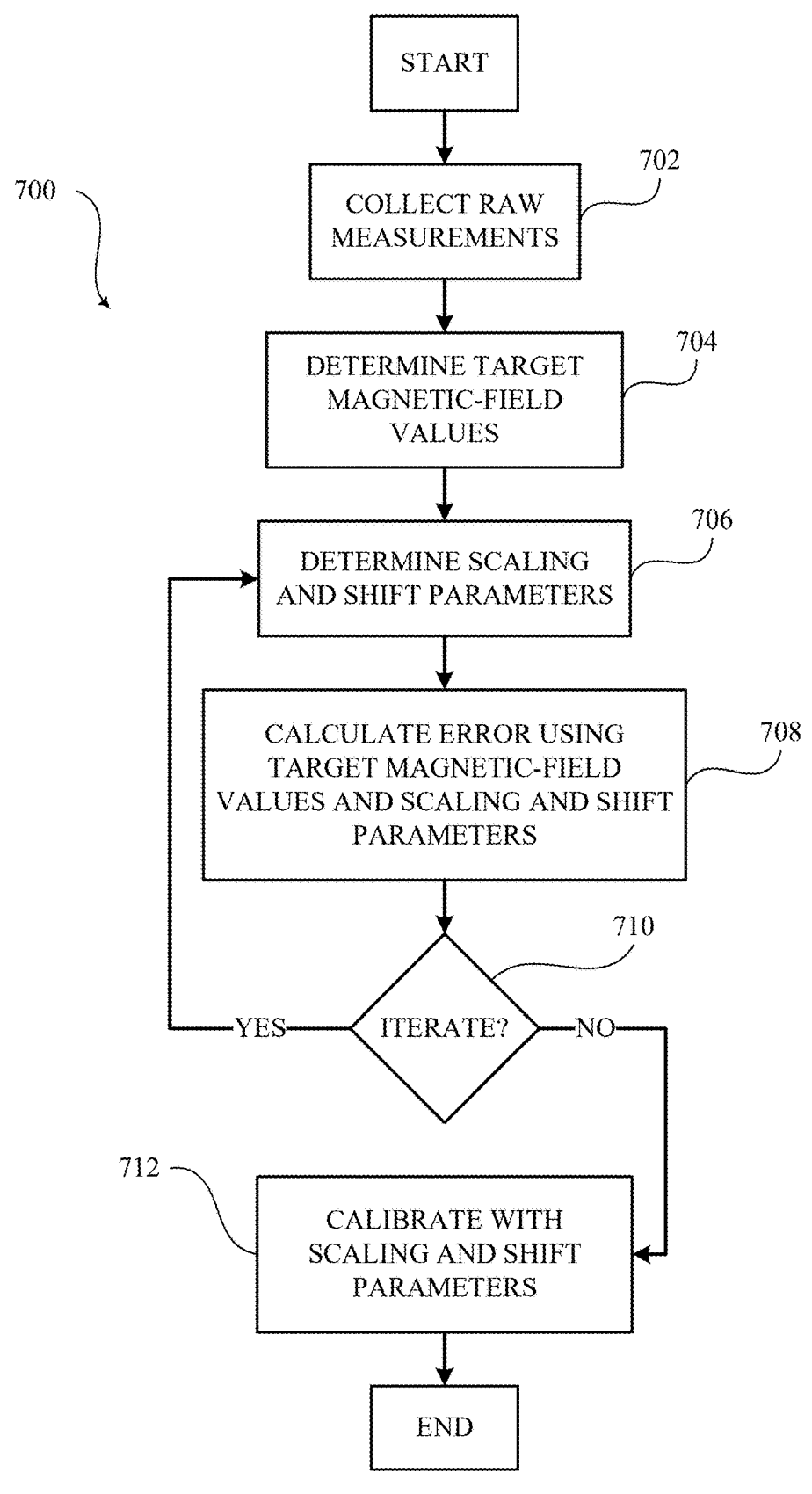
FIG. 7 illustrates an example method for generating calibration coefficients for a magnetic sensor.

FIG. 7 illustrates an example method 700 for generating calibration coefficients for a magnetic sensor. Method 700 may be carried out in whole or in part by the magnetic sensor, a device (such as, e.g., a device 200, 300, 400, or 500) containing the magnetic sensor, or by one or more components of the device (such as, e.g., a magnetic-sensor system 202 or processor 210). In addition or as an alternative, method 700 may be carried out in whole or in part by one or more other computer systems or devices. Method 700 may assume that the magnetic sensor was previously calibrated using a conventional calibration technique. In addition or as an alternative, the magnetic sensor may be calibrated using a conventional calibration technique before method 700 begins. Method 700 begins at step 702, where a set of raw measurements is collected from the magnetic sensor. The set of raw measurements may be collected before the magnetic sensor (or a device containing the magnetic sensor) is used for navigation or when the magnetic sensor (or the device containing it) is otherwise not being used for navigation. In addition or as an alternative, the set of raw measurements may be collected while the magnetic sensor is being used for navigation. Regardless of when the raw measurements are collected, collecting them when there are fewer magnetic disturbances or anomalies present may result in more accurate, precise, or reliable calibration coefficients.

At step 704, one or more target magnetic-field values are selected or otherwise determined for the location where the raw measurements were collected. The target magnetic-field values may be determined by accessing one or more known or expected magnetic-field values corresponding to that location, e.g., in a current version of the WMM, EMM, IGRF, or EMAG2 or another suitable magnetic-field map. The target magnetic-field values may, where appropriate, include one or more of the strength of the magnetic field that was measured at step 702; the inclination angle of that magnetic field; the declination angle of that magnetic field; magnetic susceptibility of that magnetic field; magnetic conductivity of that magnetic field; one or more individual components of the foregoing (such as, for example, $B_x$, $B_y$, or $B_z$); one or more derivatives of the foregoing; another property of that magnetic field; or a combination of the foregoing.

At step 706, a set of scaling and shift parameters $\alpha_x$, $\alpha_y$, $\alpha_z$ and $\beta_x$, $\beta_x$, $\beta_x$ are selected or otherwise determined. The scaling and shift parameters may be determined according to a recursive estimation method in which each iteration refines the parameter values based on the latest magnetic-field observations and adjusts them to reduce the associated calibration error. At step 708, error is calculated using the target magnetic-field values determined at step 704 and the scaling and shift parameters determined at step 706. This may be done using equation 24 or a suitable version of or alternative to it. In addition, equations 25-29 (or suitable versions of or alternatives to them) may also be used at step 706 (e.g. when the raw measurements collected at step 702 were or may have been influenced by local magnetic anomalies). Equations 24-29 may be used in any suitable combination and any suitable order. In addition, one or more of equation 24, 25, 26, 27, 28, or 29 may be skipped or otherwise left out of step 706 where appropriate.

At step 710, if the process of steps 706 and 708 diverges (e.g. the shift or scale parameters start to produce larger errors relative to the target values), then the process is stopped and method 700 may proceed to step 712. In addition or as an alternative, the process may be stopped and method 700 may proceed to step 712 after a particular (e.g. predefined or predetermined) number of iterations. In addition or as another alternative, the process may be stopped and method 700 may proceed to step 712 if the calculated error or minimums reach or come within a predefined or predetermined amount of one or more predefined or predetermined threshold values. At step 710, if those conditions are not met, method 700 returns to step 706. Although particular conditions for proceeding to step 712 from 710 are described or illustrated herein, this disclosure contemplates any suitable conditions for proceeding to step 712 from 710. At step 712, the scaling and shift parameters determined at the last iteration of step 706 are then used as calibration coefficients for calibration of the magnetic sensor, at which point method 700 ends. Those scaling and shift parameters may continue to be used as calibration coefficients for calibration of the magnetic sensor indefinitely or until one or more particular (e.g. predefined or predetermined) conditions are met or events occur.

Particular embodiments may repeat one or more steps of method 700, where appropriate. Although this disclosure describes or illustrates particular steps of method 700 as occurring in a particular order, this disclosure contemplates any suitable steps of method 700 occurring in any suitable order. Moreover, although this disclosure describes or illustrates an example method for generating calibration coefficients for a magnetic sensor including the particular steps of method 700, this disclosure contemplates any suitable method for generating calibration coefficients for a magnetic sensor including any suitable steps, which may include all, some, or none of the steps of method 700, where appropriate. Furthermore, although this disclosure describes or illustrates particular components, devices, or systems carrying out particular steps of method 700, this disclosure contemplates any suitable combination of any suitable components, devices, or systems carrying out any suitable steps of method 700.

Figure 8:
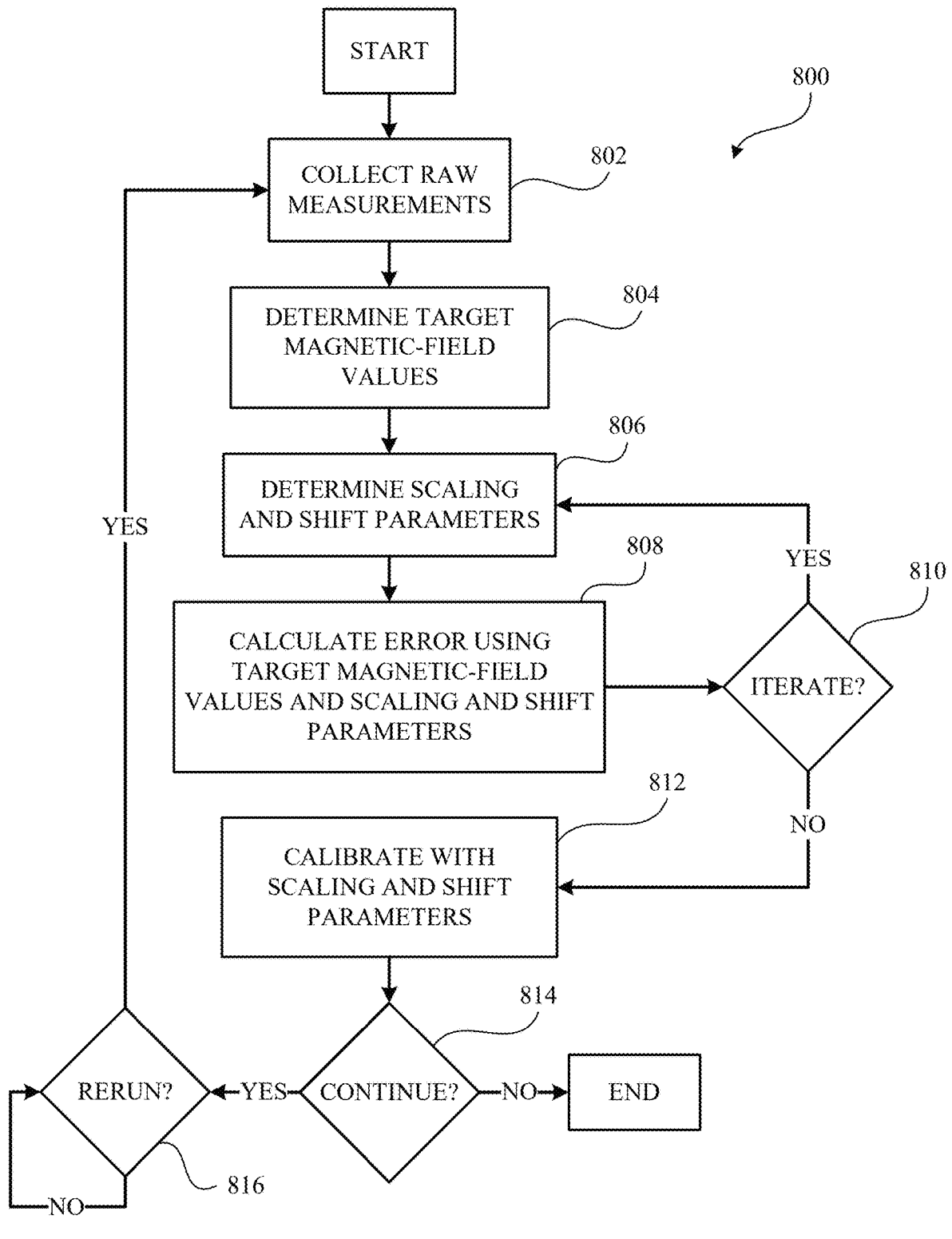
FIG. 8 illustrates another example method for generating calibration coefficients for a magnetic sensor.

FIG. 8 illustrates an example method 800 for generating calibration coefficients for a magnetic sensor. Method 800 may be carried out in whole or in part by the magnetic sensor, a device (such as, e.g., a device 200, 300, 400, or 500) containing the magnetic sensor, or by one or more components of the device (such as, e.g., a magnetic-sensor system 202 or processor 210). In addition or as an alternative, method 800 may be carried out in whole or in part by one or more other computer systems or devices. Method 800 may assume that the magnetic sensor was previously calibrated using a conventional calibration technique. In addition or as an alternative, the magnetic sensor may be calibrated using a conventional calibration technique before method 800 begins. Method 800 begins at step 802, where a set of raw measurements is collected from the magnetic sensor. The set of raw measurements may be collected before the magnetic sensor (or a device containing the magnetic sensor) is used for navigation or when the magnetic sensor (or the device containing it) is otherwise not being used for navigation. In addition or as an alternative, the set raw measurements may be collected while the magnetic sensor is being used for navigation. Regardless of when the raw measurements are collected, collecting them when there are fewer magnetic disturbances or anomalies present may result in more accurate, precise, or reliable calibration coefficients.

At step 804, one or more target magnetic-field values are selected or otherwise determined for the location where the raw measurements were collected. The target magnetic-field values may be determined by accessing one or more known or expected magnetic-field values corresponding to that location, e.g., in a current version of the WMM, EMM, IGRF, or EMAG2 or another suitable magnetic-field map. The target magnetic-field values may, where appropriate, include one or more of the strength of the magnetic field that was measured at step 802; the inclination angle of that magnetic field; the declination angle of that magnetic field; magnetic susceptibility of that magnetic field; magnetic conductivity of that magnetic field; one or more individual components of the foregoing (such as, for example, $B_x$, $B_y$, or $B_z$); one or more derivatives of the foregoing; another property of that magnetic field; or a combination of the foregoing.

At step 806, a set of scaling and shift parameters $\alpha_x$, $\alpha_y$, $\alpha_z$ and $\beta_x$, $\beta_x$, $\beta_x$ are selected or otherwise determined. The scaling and shift parameters may be determined according to a recursive estimation method in which each iteration refines the parameter values based on the latest magnetic-field observations and adjusts them to reduce the associated calibration error. At step 808, error is calculated using the target magnetic-field values determined at step 804 and the scaling and shift parameters determined at step 806. This may be done using equation 24 or a suitable version of or alternative to it. In addition, equations 25-29 (or suitable versions of or alternatives to them) may also be used at step 806 (e.g. when the raw measurements collected at step 802 were or may have been influenced by local magnetic anomalies). Equations 24-29 may be used in any suitable combination and any suitable order. In addition, one or more of equation 24, 25, 26, 27, 28, or 29 may be skipped or otherwise left out of step 806 where appropriate.

At step 810, if the process of steps 806 and 808 diverges (e.g. the shift or scale parameters start to produce larger errors relative to the target values), then the process is stopped and method 800 may proceed to step 812. In addition or as an alternative, the process may be stopped and method 800 may proceed to step 812 after a particular (e.g. predefined or predetermined) number of iterations. In addition or as another alternative, the process may be stopped and method 800 may proceed to step 812 if the calculated error or minimums reach or come within a predefined or predetermined amount of one or more predefined or predetermined threshold values. At step 810, if those conditions are not met, method 800 returns to step 806. Although particular conditions for proceeding to step 812 from 810 are described or illustrated herein, this disclosure contemplates any suitable conditions for proceeding to step 812 from 810.

At step 812, the scaling and shift parameters determined at the last iteration of step 806 are used as calibration coefficients for calibration of the magnetic sensor. Those scaling and shift parameters are used as calibration coefficients for calibration of the magnetic sensor until one or more particular (e.g. predefined or predetermined) conditions are met or events occur. At step 814, it is determined whether calibration of the magnetic sensor is to continue. If it is, then method 800 proceeds to step 816. Otherwise, method 800 ends. For example, calibration of the magnetic sensor may continue for as long as the magnetic sensor is being used (or while a device containing the magnetic sensor is being used) for its intended function or in its intended operation. As another example, calibration of the magnetic sensor may continue until a user provides instructions to stop calibrating the magnetic sensor. As an alternative, step 814 may be bypassed or omitted entirely, with method 800 proceeding directly from step 812 to step 816 (allowing method 800 to continue indefinitely).

At step 816, circumstances relevant to the magnetic sensor are monitored for one or more conditions or events that may affect the accuracy, precision, or reliability of the magnetic sensor. When such a condition is met or such an event occurs, method 800 returns to step 802 and steps 802-812 are rerun to generate new calibration coefficients for calibration of the magnetic sensor. For example, method 800 may return to step 802 and steps 802-812 may be rerun to generate new calibration coefficients on a periodic basis or at a particular frequency. The period or frequency may be predefined or predetermined or determined in real time while method 800 is running. As another example, method 800 may return to step 802 and steps 802-812 may be rerun to generate new calibration coefficients if one or more threshold criteria (such as, for example, variance in the magnetic field being measured by the magnetic sensor or one or more differences between calibrated measurements generated with the current calibration coefficients and target or expected magnetic-field values of the magnetic field being measured by the magnetic sensor) are met. The threshold criteria may be predefined or predetermined or determined in real time while method 800 is running. In addition or as an alternative, if the magnetic sensor (or a device containing the magnetic sensor) leaves the location where the raw measurements were collected at step 802, then method 800 may return to step 802 and steps 802-812 may be rerun to generate new calibration coefficients. In addition or as an alternative, method 800 may return to step 802 and steps 802-812 may be rerun to generate new calibration coefficients if the magnetic sensor has translated a particular (e.g. predefined or predetermined) distance since the current calibration coefficients were generated. In addition or as an alternative, method 800 may return to step 802 and steps 802-812 may be rerun to generate new calibration coefficients if magnetic anomalies or other conditions are detected that may influence measurement by the magnetic sensor or otherwise render the current calibration coefficients less effective at producing more accurate, precise, or reliable calibrated measurements. As an alternative, step 816 may be bypassed or omitted entirely, with method 800 proceeding directly from step 812 or 814 directly to step 802 without pausing. Although particular conditions for rerunning steps 802-812 are described or illustrated herein, this disclosure contemplates any suitable conditions for rerunning steps 802-812.

Particular embodiments may repeat one or more steps of method 800, where appropriate. Although this disclosure describes or illustrates particular steps of method 800 as occurring in a particular order, this disclosure contemplates any suitable steps of method 800 occurring in any suitable order. Moreover, although this disclosure describes or illustrates an example method for generating calibration coefficients for a magnetic sensor including the particular steps of method 800, this disclosure contemplates any suitable method for generating calibration coefficients for a magnetic sensor including any suitable steps, which may include all, some, or none of the steps of method 800, where appropriate. Furthermore, although this disclosure describes or illustrates particular components, devices, or systems carrying out particular steps of method 800, this disclosure contemplates any suitable combination of any suitable components, devices, or systems carrying out any suitable steps of method 800.

Figure 9:
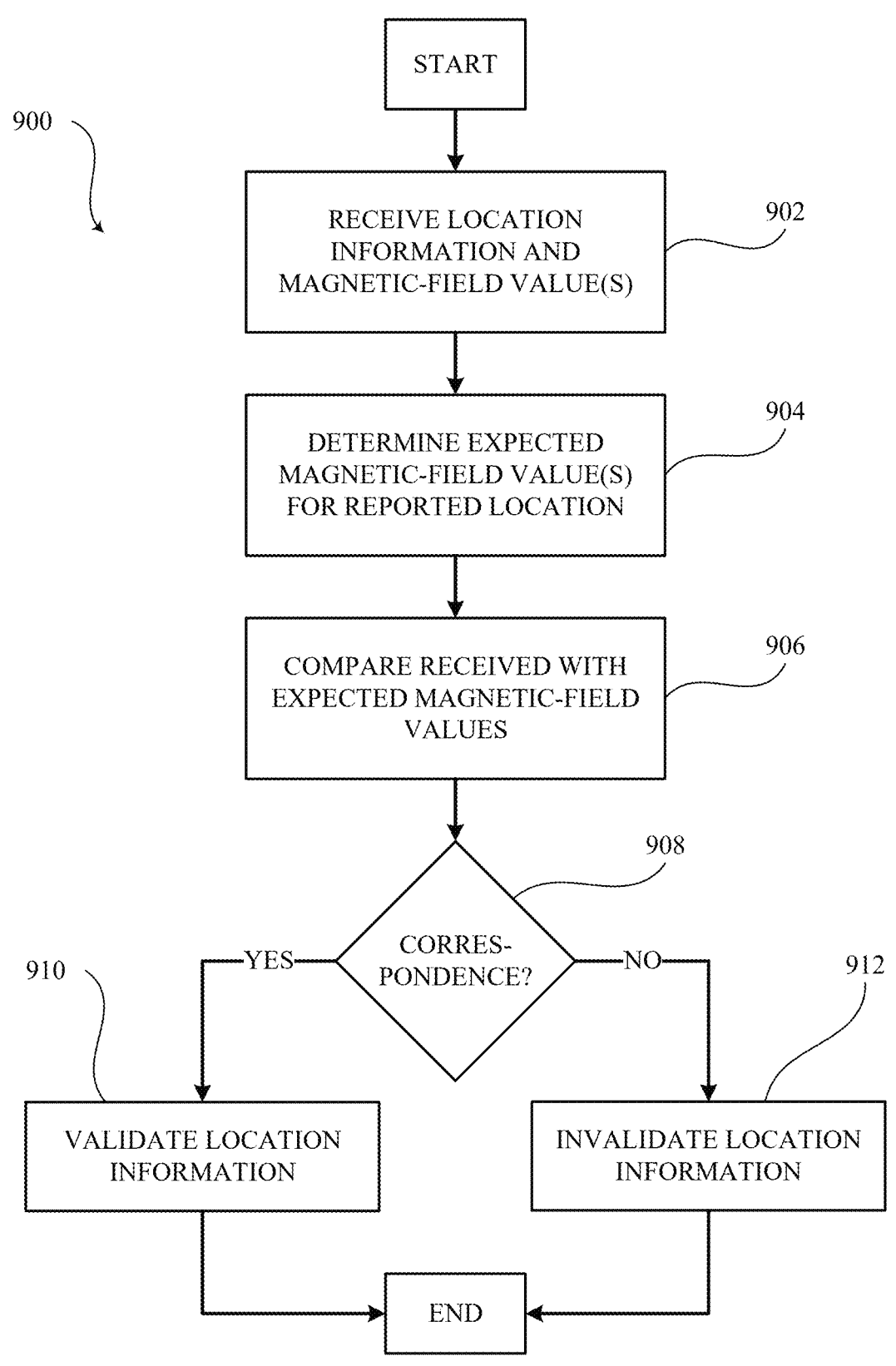
FIG. 9 illustrates an example method for validating geo-location information.

FIG. 9 illustrates an example method 900 for validating geolocation information. Method 900 may be carried out in whole or in part by one or more computer systems or other devices (such as, e.g., a computer system 1200 or a device 200, 300, 400, or 500). Method 900 begins at step 902, where location information of a device and magnetic-field values measured by a magnetic-sensor system of the device are received. The location information may include a reported location of the device, and the magnetic-field values may have been measured at the reported location. The location information may include GNSS location information, communication-interface location information, or other suitable location information. For example, the location information may have been generated or provided by or purport to have been generated or provided by a GNSS receiver (such as, e.g., GNSS receiver 206). As another example, the location information may have been generated or provided by or purport to have been generated or provided by a communication interface (such as, e.g., communication interface 208). This may include one or more IP addresses or purported IP addresses of the device. In addition or as an alternative, this may include one or more location determinations made or purported to be made by cellular-tower triangulation or other multilateration with the communication interface. Although particular location information is described or illustrated herein, this disclosure contemplates any suitable location information. The magnetic-sensor system (or one or more magnetic sensors of the magnetic sensors of the magnetic-sensor system) of the device that measured the magnetic-field values may have been calibrated using an embodiment of the calibration-coefficient algorithm disclosed herein.

At step 904, one or more expected magnetic-field values are determined for the reported location. This may be done by referring to one or more publicly available or other magnetic-field maps (such as, e.g., a current version of the WMM, EMM, IGRF, or EMAG2) that include one or more expected magnetic-field values for the reported location. The expected magnetic-field values may include the expected total strength, magnetic inclination, or magnetic declination at the reported location or any other suitable expected magnetic-field values (or combination thereof) at the reported location. At step 906, the magnetic-field values received at step 902 are compared with expected magnetic-field values determined at step 904.

At step 908, if the magnetic-field values received at step 902 correspond to the expected magnetic-field values determined at step 904, then method 900 proceeds to step 910. On the other hand, if the received magnetic-field values do not correspond to the expected magnetic-field values, then method 900 proceeds to step 912. For example, if the received magnetic-field values include a magnetic-inclination value that matches or is within a particular (e.g. predefined or predetermined) range of an expected magnetic-inclination value for the reported location, then it may be determined that the received magnetic-field values correspond to the expected magnetic-field values. From this, it may be determined that the device is or was in fact at the reported location. On the other hand, if the received magnetic-field values include a magnetic-inclination value that differs from or is not within a particular (e.g. predefined or predetermined) range of an expected magnetic-inclination value for the reported location, then it may be determined that the received magnetic-field values do not correspond to the expected magnetic-field values. From this, it may be determined that the device is or was not in fact at the reported location, which may be a result of spoofing or other deception.

At step 910, the location information received at step 902 is validated, at which point method 900 ends. For example, at step 910, it may be reported that the device is or was in fact at the reported location, which may be used to authenticate the device or a user associated with the device. At step 912, the location information received at step 902 is invalidated, at which point method 900 ends. For example, at step 912, it may be reported that the device is or was not in fact at the reported location or that potential spoofing or other deception has occurred or is occurring, which may be used to reject or revoke authentication of the device or a user associated with the device.

Particular embodiments may repeat one or more steps of method 900, where appropriate. Although this disclosure describes or illustrates particular steps of method 900 as occurring in a particular order, this disclosure contemplates any suitable steps of method 900 occurring in any suitable order. Moreover, although this disclosure describes or illustrates an example method for validating geolocation information including the particular steps of method 900, this disclosure contemplates any suitable method for validating geolocation information including any suitable steps, which may include all, some, or none of the steps of method 900, where appropriate. Furthermore, although this disclosure describes or illustrates particular components, devices, or systems carrying out particular steps of method 900, this disclosure contemplates any suitable combination of any suitable components, devices, or systems carrying out any suitable steps of method 900.

Figure 10:
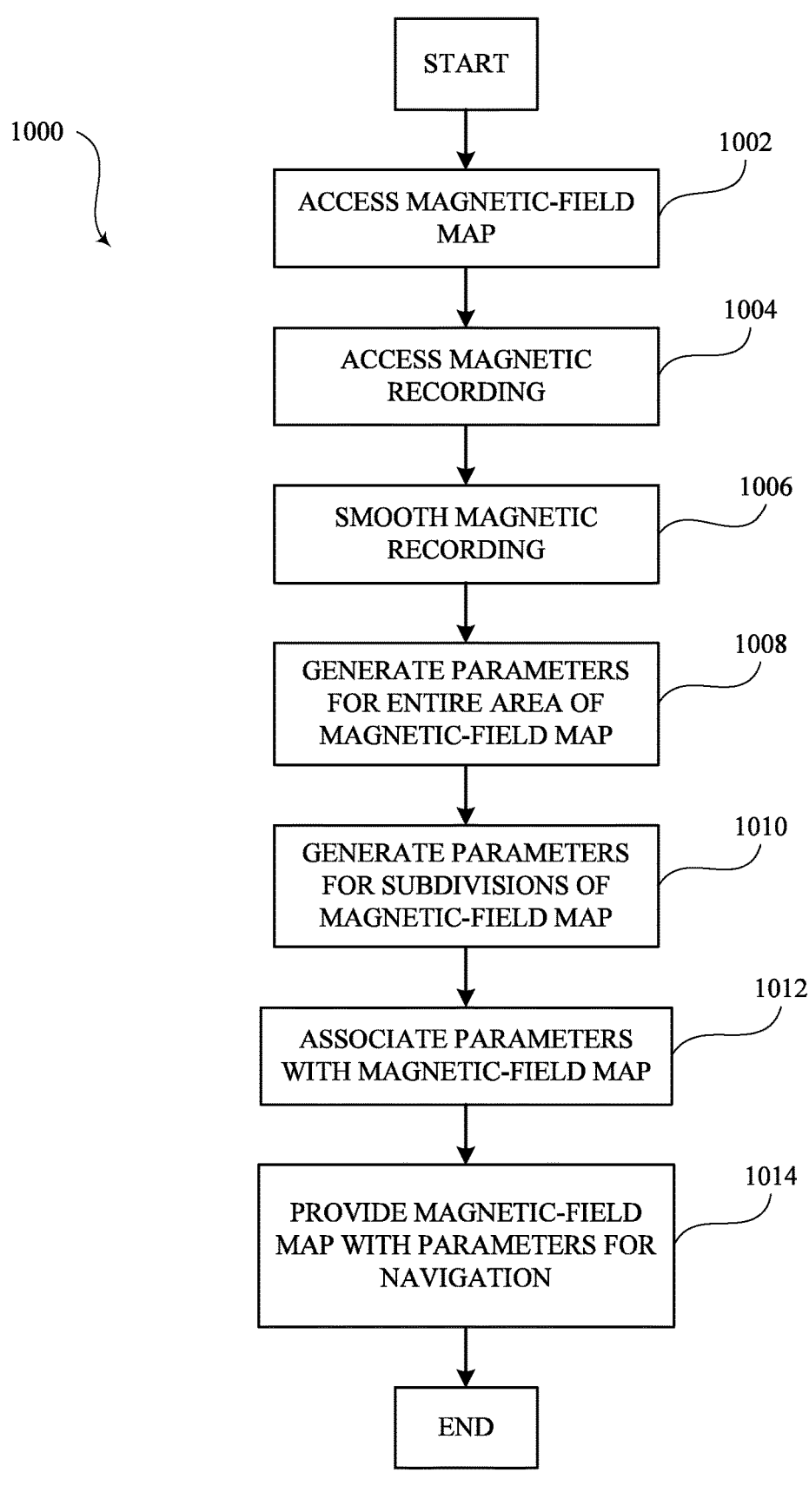
FIG. 10 illustrates an example method for dynamic selection of parameters for navigation.

FIG. 10 illustrates an example method 1000 for dynamic selection of parameters (e.g. DTW parameters) for navigation with a magnetic-field map. Method 1000 begins at step 1002, where a magnetic-field map is accessed. The magnetic-field map may cover a two- or three-dimensional region and include data representing magnetic-field values that correspond to points or locations in that region. That data may be organized as a relational database and recorded in a bin or other file. At step 1004, a magnetic recording is accessed. The magnetic recording may include data representing a time or distance series of magnetic measurements made along a trajectory in the region covered by the magnetic-field map, and that data may be formatted as CSV. At step 1006, the magnetic recording is smoothed, e.g. according to a sampling rate of the magnetic-field map. At step 1008, a set of parameters for the extent of the magnetic-field map is generated based on a comparison of one or more points in the magnetic recording with the magnetic-field map using DTW, COW, or another suitable warping algorithm or particle filtering. At step 1010, one or more sets of parameters for each of one or more subdivisions of the magnetic-field map are generated based on a comparison of one or more points in the magnetic recording with the subdivision of the magnetic-field map using DTW, COW, or another suitable warping algorithm or particle filtering. At step 1008 and 1010, the sets of parameters may be generated using an embodiment of the DTW_api_test and DTW_results_optimize algorithms described above or any other suitable algorithm. The parameters generated at step 1008 or 1010 may include one or more WTD or Euclidean or other distance metric; warping constraints; window constraints or starting-column index scores; normalization rules; path constraints or step patterns; error metrics or thresholds; sampling parameters; or runtime constraint. In addition or as an alternative, the parameters generated at step 1008 or 1010 may include one or more Kalman-filter or Bayesian-optimizer scores or other settings. Although particular parameters for particular warping or filtering algorithms are described or illustrated herein, this disclosure contemplates any suitable parameters for any suitable warping or filtering algorithms. At step 1012, the parameters generated at step 1008 and 1010 are added or linked to or otherwise associated with the magnetic-field map, along with their correspondences to the entire area or specific subdivisions of the magnetic-field map. At step 1014, the magnetic-field map is provided with those parameters for navigation, at which point method 1000 ends.

Particular embodiments may repeat one or more steps of method 1000, where appropriate. Although this disclosure describes or illustrates particular steps of method 1000 as occurring in a particular order, this disclosure contemplates any suitable steps of method 1000 occurring in any suitable order. Moreover, although this disclosure describes or illustrates an example method for dynamic selection of parameters for navigation with a magnetic-field map including the particular steps of method 1000, this disclosure contemplates any suitable method for dynamic selection of parameters for navigation with a magnetic-field map including any suitable steps, which may include all, some, or none of the steps of method 1000, where appropriate. Furthermore, although this disclosure describes or illustrates particular components, devices, or systems carrying out particular steps of method 1000, this disclosure contemplates any suitable combination of any suitable components, devices, or systems carrying out any suitable steps of method 1000.

Figure 11:
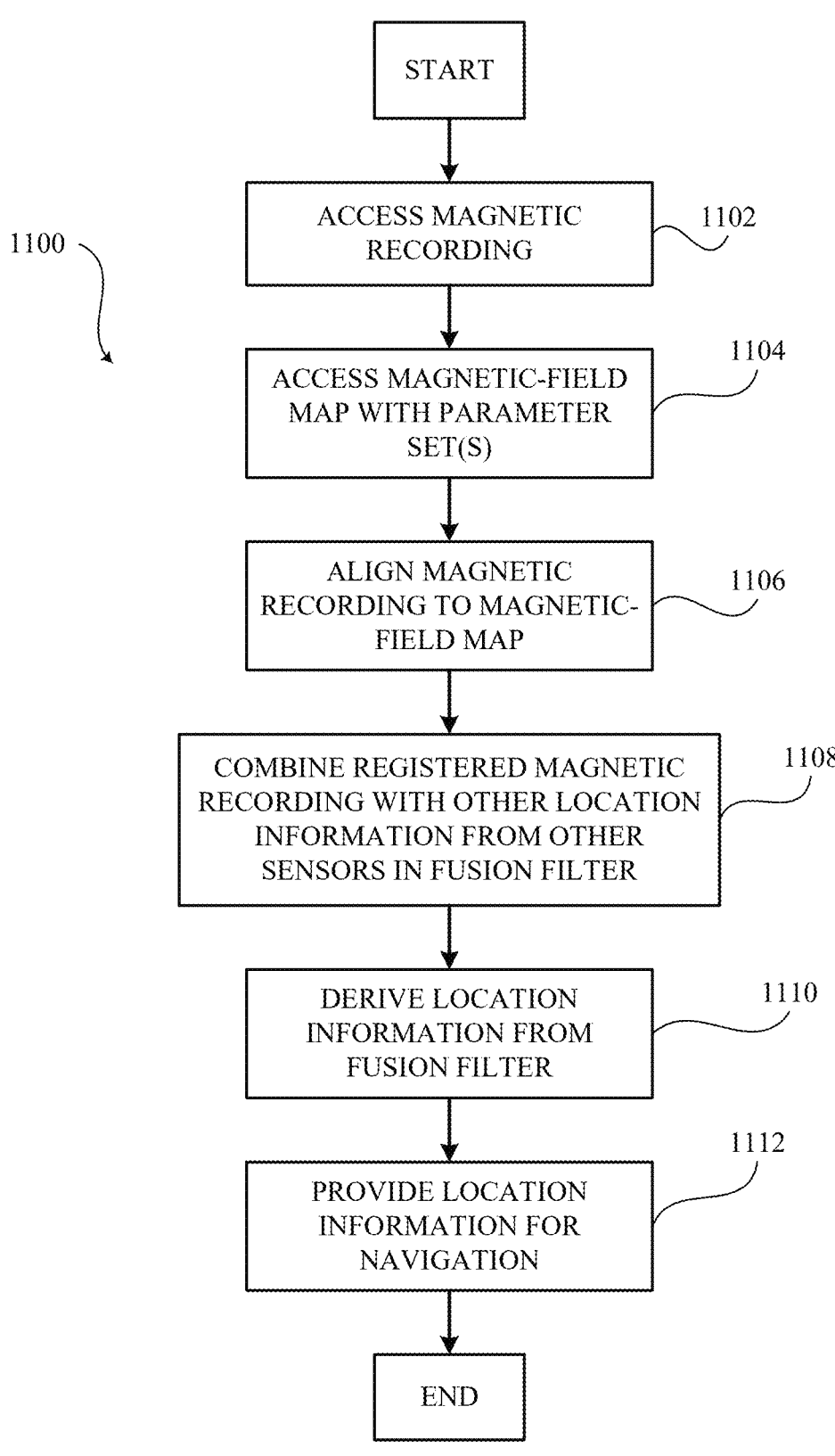
FIG. 11 illustrates an example method for sensor fusion with dynamic selection of parameters for navigation.

FIG. 11 illustrates an example method for sensor fusion with DTW. Method 1100 begins at step 1102, where a magnetic recording is accessed. When accessed, the magnetic recording may be completed or still in progress. A device (such as, e.g., a device 200, 300, 400, 500, or any other suitable device) may make the magnetic recording of its trajectory as it translates through a region covered by a magnetic-field map. The magnetic sensor(s) that made those magnetic measurements in the magnetic recording may have been calibrated using an embodiment of the calibration-coefficient algorithm disclosed herein, and the magnetic recording may include one or more magnetic recordings or a portion of a magnetic recording. At step 1104, a magnetic-field map of the region is accessed. The magnetic-field map may include or otherwise be associated with one or more sets of DTW (or other warping or filtering) parameters generated with the dynamic-parameter algorithm disclosed herein, by method 1000, or another suitable technique. As an example, one or more of the sets of DTW (or other warping or filtering) parameters may work best (e.g. provide the most accurate alignment to the magnetic-field map) across the extent of the magnetic-field map, and one or more of the other sets of the DTW (or other warping or filtering) parameters may each work best (e.g. provide the most accurate alignment to the magnetic-field map) in a particular subdivision of the magnetic-field map, as described above. As another example, in addition or as an alternative, one or more of the sets of DTW (or other warping or filtering) parameters may work best for particular translation speeds, also as described above. Although particular parameters for particular conditions are described or illustrated herein (e.g. for different subdivisions of a magnetic-field map or for different translation speeds), this disclosure contemplates any suitable parameters for any suitable conditions.

At step 1106, the magnetic recording is registered or otherwise aligned to the magnetic-field map using DTW (or another warping or filtering algorithm) and the one or more DTW (or other warping or filtering) parameter sets associated with the magnetic-field map. This may involve "warping" or otherwise adjusting the magnetic recording to coincide (at least approximately) with a path or other series or set of points in the magnetic-field map or identifying points in the magnetic-field map corresponding to points in the magnetic recording and then translating or otherwise adjusting the latter to coincide (at least approximately) with the former. For example, the DTW (or other warping or filtering) parameters in the magnetic-field map used for this adjustment of the magnetic recording may be selected based on whether the magnetic recording corresponds to a subdivision of the magnetic-field map with a set of DTW (or other warping or filtering) parameters specific to that subdivision. If it does, then the DTW (or other warping or filtering) parameter set specific to that subdivision may be used to align the magnetic recording to the magnetic-field map. If it does not, then the DTW (or other warping or filtering) parameter set in the magnetic-field map that works best for the extent of the magnetic-field map may be used. As another example, in addition or as an alternative, one or more DTW (or other warping or filtering) parameters in the magnetic-field map corresponding to a translation speed associated with the magnetic recording may be selected for this adjustment of the magnetic recording.

At step 1108, the magnetic recording as aligned to the magnetic-field map (or location information from that alignment) is combined (e.g. using one or more statistical techniques) in a fusion filter with other location information from one or more other sensors (such as, e.g., in the case of device 200, INS 204, GNSS receiver 206, or communication interface 208). At step 1110, location information about the device is derived from the fusion filter. This location information may include a location, heading, orientation, bearing, course, track, path, trajectory, or velocity of the device. At step 1112, the location information derived at step 1110 is provided for use in navigation by or with the device, at which point the method ends. Method 1100 may be repeated as the device continues to translate through the region covered by the magnetic-field map and, at step 1104, if the device has translated to a new region not covered by the original magnetic-field map, then a new magnetic-field map covering the new region (and including DTW (or other warping or filtering) parameters) may be accessed.

Particular embodiments may repeat one or more steps of method 1100, where appropriate. Although this disclosure describes or illustrates particular steps of method 1100 as occurring in a particular order, this disclosure contemplates any suitable steps of method 1100 occurring in any suitable order. Moreover, although this disclosure describes or illustrates an example method for sensor fusion with DTW including the particular steps of method 1100, this disclosure contemplates any suitable method for sensor fusion with DTW including any suitable steps, which may include all, some, or none of the steps of method 1100, where appropriate. Furthermore, although this disclosure describes or illustrates particular components, devices, or systems carrying out particular steps of method 1100, this disclosure contemplates any suitable combination of any suitable components, devices, or systems carrying out any suitable steps of method 1100.

Where appropriate, any suitable methods, apparatus, or systems in any of the following may be used in whole or in part with any of the methods, apparatus, or systems disclosed herein (or vice versa), each of which is incorporated herein by reference in its entirety for all purposes: U.S. Pat. No. 11,428,532, entitled Generating a Geomagnetic Map; U.S. Pat. No. 11,680,802, entitled Correlating Overlapping Magnetic Measurement Data from Multiple Magnetic Navigation Devices and Updating a Geomagnetic Map With That Data; U.S. Pat. No. 11,725,946, entitled Operating Modes of Magnetic Navigation Devices; U.S. Pat. No. 11,719,716, entitled Measuring Distance Traversed or Speed; U.S. Pat. No. 12,498,245, entitled Embedding a Magnetic Map into an Image File; U.S. Patent Application Publication No. US 2025/0052909 A1, entitled Using Magnetic-Sensor Data to Correct for INS Drift; U.S. Patent Application Publication No. US 2025/0116785 A1, entitled Detecting and Correcting for Location Drift in PNT Systems; U.S. Patent Application Publication No. US 2025/0052576 A1, entitled Determining Confidence in Magnetic-Sensor Data; U.S. Patent Application Publication No. US 2025/0052577 A1, entitled Determining Movement in an Opposite Direction; U.S. Patent Application Publication No. US 2025/0056235 A1, entitled Authenticating a Device Using Geofencing Data; and U.S. Pat. No. 12,474,168 B2, entitled Using a Magnetic Recording for Authentication. For example, where appropriate, certain methods, apparatus, or systems in the preceding may be used in whole or in part with dead reckoning, warping or filtering algorithms, sensor fusion or fusion filters, the calibration-coefficient algorithm, the dynamic-parameter algorithm, or the validation of geolocation information as disclosed herein (or vice versa).

Figure 12:
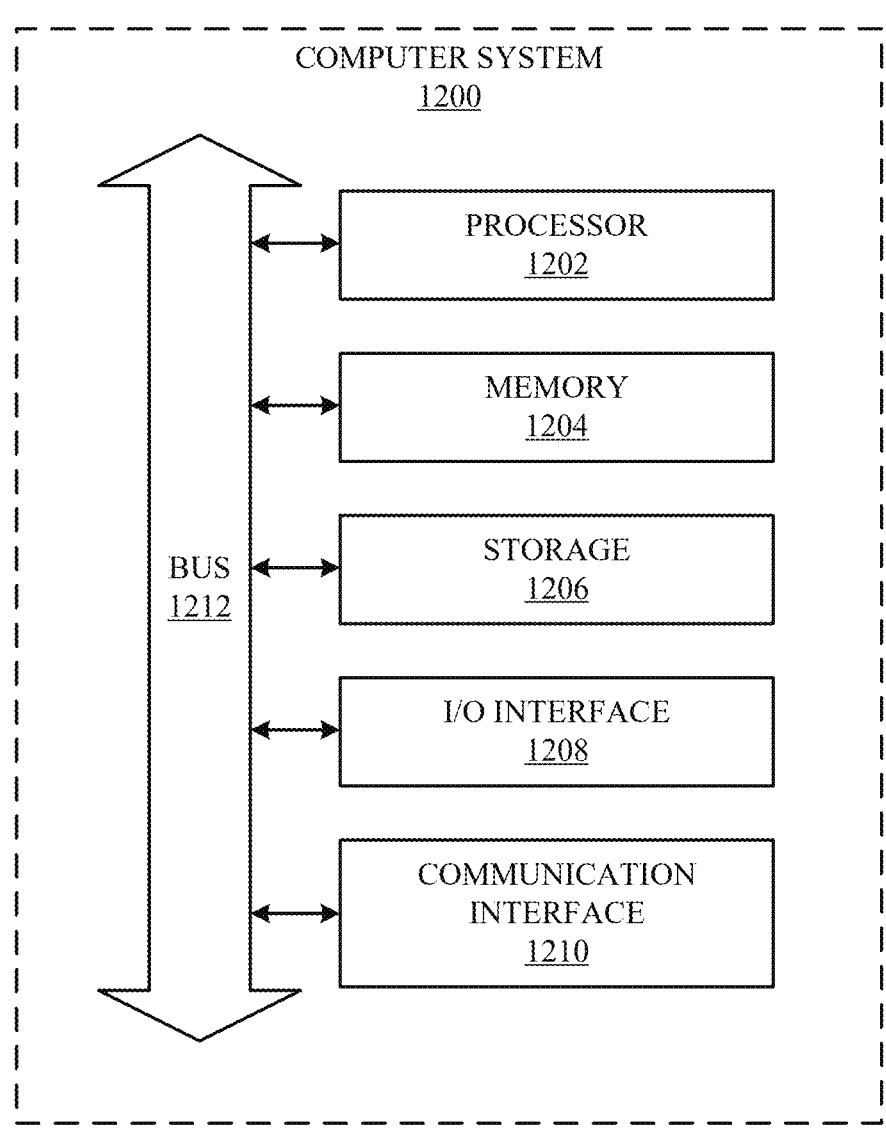
FIG. 12 illustrates an example computer system.

FIG. 12 illustrates an example computer system 1200. In particular embodiments, one or more computer systems 1200 perform one or more steps of one or more methods described or illustrated herein. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 1200. Herein, reference to a computer system may include a computing device, and vice versa, where appropriate. Moreover, reference herein to a computer system may include one or more computer systems, where appropriate. Device 200, 300, 400, or 500 may include one or more computer systems 1200 (or one or more components of a computer system 1200).

This disclosure contemplates any suitable number of computer systems 1200. This disclosure contemplates computer system 1200 taking any suitable physical form. As an example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a PDA, a server, a tablet computer system, or a combination of two or more of these. Where appropriate, computer system 1200 may include one or more computer systems

1200; be unitary or distributed; span multiple locations; span multiple machines; span multiple data centers; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212. Although this disclosure describes or illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more ALUs; be a multi-core processor; or include one or more processors 1202. Although this disclosure describes or illustrates a particular processor, this disclosure contemplates any suitable processor.

In particular embodiments, memory 1204 includes main memory for storing instructions for processor 1202 to execute or data for processor 1202 to operate on. As an example and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memories 1204, where appropriate. Although this disclosure describes or illustrates particular memory, this disclosure contemplates any suitable memory.

In particular embodiments, storage 1206 includes mass storage for data or instructions. As an example and not by way of limitation, storage 1206 may include an HDD, a floppy disk drive, flash memory, an optical disc, a magneto-optical disc, magnetic tape, or a USB drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes ROM. Where appropriate, this ROM may be mask-programmed ROM, PROM, EPROM, EEPROM, EAROM, or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes or illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, microphone, monitor, mouse, printer, scanner, speaker, still camera, stylus, tablet, touch screen, trackball, video camera, another suitable I/O device, or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor

1202 to drive one or more of these I/O devices. I/O interface 1208 may include one or more I/O interfaces 1208, where appropriate. Although this disclosure describes or illustrates a particular I/O interface, this disclosure contemplates any suitable I/O interface.

In particular embodiments, communication interface 1210 includes hardware, software, or both providing one or more interfaces for communication (such as, for example, packet-based communication) between computer system 1200 and one or more other computer systems 1200 or one or more networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1210 for it. As an example and not by way of limitation, computer system 1200 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 1200 may communicate with a WPAN (such as, for example, a BLUETOOTH WPAN), a WI-FI network, a WIMAX network, a cellular telephone network (such as, for example, a GSM network), or other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes or illustrates a particular communication interface, this disclosure contemplates any suitable communication interface.

In particular embodiments, bus 1212 includes hardware, software, or both coupling components of computer system 1200 to each other. As an example and not by way of limitation, bus 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes or illustrates a particular bus, this disclosure contemplates any suitable bus or interconnect.

Herein, a computer-readable non-transitory storage medium or media may include one or more semiconductor-based or other ICs (such, as for example, field-programmable gate arrays (FPGAs) or application-specific ICs (ASICs)), HDDs, hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure includes all changes, substitutions, variations, alterations, and modifications to the example embodiments described or illustrated herein that a person having ordinary skill in the art would comprehend. The scope of this disclosure is not limited to the example embodiments described or illustrated herein. The embodiments disclosed herein are only examples, and the scope of this disclosure is not limited to them. Moreover, although this disclosure describes or illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Particular embodiments may include all, some, or none of the components, elements, features, functions, operations, or steps of the embodiments disclosed herein. Furthermore, reference in the appended claims to an apparatus or system or a component of an apparatus or system being adapted to, arranged to, capable of, configured to, enabled to, operable to, or operative to perform a particular function includes that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method comprising:
by an electronic device, accessing a magnetic-field map of a region comprising data that represents magnetic-field values that correspond to locations in the region;
by the electronic device, accessing a sample magnetic recording comprising data that represents a time or distance series of magnetic measurements made along a path in the region;
by the electronic device, at least approximately aligning the sample magnetic recording to the magnetic-field map;
by the electronic device, based on the alignment:
generating a first set of parameters for aligning subsequent magnetic recordings to the magnetic-field map across a substantial entirety of the magnetic-field map; and
generating one or more second sets of parameters for aligning subsequent magnetic recordings to the magnetic-field map in one or more subdivisions of the magnetic-field map, wherein each of the second sets of parameters corresponds to one of the subdivisions;
by the electronic device, associating the first and second sets of parameters with the magnetic-field map; and by the electronic device, providing the magnetic-field map with the first and second sets of parameters associated with it for subsequent navigation.

2. The method of claim 1, wherein the region is one-dimensional, two-dimensional, or three-dimensional.

3. The method of claim 1, wherein the magnetic recording is at least approximately aligned to the magnetic-field map using one or more of dynamic time warping (DTW), correlated optimized warping (COW), derivative dynamic time warping (DDTW), weighted dynamic time warping (WDTW), soft dynamic time warping (soft-DTW), global alignment kernel (GAK), edit distance with real penalty (ERP), longest common subsequence (LCSS), time-warp edit distance (TWED), or particle filtering.

4. The method of claim 1, wherein the first and second sets of parameters are for aligning the subsequent magnetic recordings to the magnetic-field map using one or more of dynamic time warping (DTW), correlated optimized warping (COW), derivative dynamic time warping (DDTW), weighted dynamic time warping (WDTW), soft dynamic time warping (soft-DTW), global alignment kernel (GAK), edit distance with real penalty (ERP), longest common subsequence (LCSS), time-warp edit distance (TWED), or particle filtering.

5. The method of claim 1, wherein the first and second sets of parameters comprise one or more of:
a distance metric;
a warping constraint;
a window constraint;
a starting-column index score;
a normalization rule;
a path constraint;
a step pattern;
an error metric;
a sampling parameter;
a runtime constraint; or
a Kalman-filter or Bayesian-optimizer score.

6. The method of claim 1, wherein the sample magnetic recording is smoothed according to a sampling rate of the magnetic-field map before alignment to the magnetic-field map.

7. The method of claim 1, wherein the first and second sets of parameters are generated using one or more of a non-Kalman query, a Kalman filter, or Bayesian optimization with Gaussian processes.

8. One or more computer-readable non-transitory storage media embodying software that is operable when executed to:
access a magnetic-field map of a region comprising data that represents magnetic-field values that correspond to locations in the region;
access a sample magnetic recording comprising data that represents a time or distance series of magnetic measurements made along a path in the region;
at least approximately align the sample magnetic recording to the magnetic-field map;
based on the alignment:
generate a first set of parameters for aligning subsequent magnetic recordings to the magnetic-field map across a substantial entirety of the magnetic-field map; and
generate one or more second sets of parameters for aligning subsequent magnetic recordings to the magnetic-field map in one or more subdivisions of the magnetic-field map, wherein each of the second sets of parameters corresponds to one of the subdivisions;

associate the first and second sets of parameters with the magnetic-field map; and provide the magnetic-field map with the first and second sets of parameters associated with it for subsequent navigation.

9. The media of claim 8, wherein the region is one-dimensional, two-dimensional, or three-dimensional.

10. The media of claim 8, wherein the magnetic recording is at least approximately aligned to the magnetic-field map using one or more of dynamic time warping (DTW), correlated optimized warping (COW), derivative dynamic time warping (DDTW), weighted dynamic time warping (WDTW), soft dynamic time warping (soft-DTW), global alignment kernel (GAK), edit distance with real penalty (ERP), longest common subsequence (LCSS), time-warp edit distance (TWED), or particle filtering.

11. The media of claim 8, wherein the first and second sets of parameters are for aligning the subsequent magnetic recordings to the magnetic-field map using one or more of dynamic time warping (DTW), correlated optimized warping (COW), derivative dynamic time warping (DDTW), weighted dynamic time warping (WDTW), soft dynamic time warping (soft-DTW), global alignment kernel (GAK), edit distance with real penalty (ERP), longest common subsequence (LCSS), time-warp edit distance (TWED), or particle filtering.

12. The media of claim 8, wherein the first and second sets of parameters comprise one or more of:

a distance metric;
a warping constraint;
a window constraint;
a starting-column index score;
a normalization rule;
a path constraint;
a step pattern;
an error metric;
a sampling parameter;
a runtime constraint; or
a Kalman-filter or Bayesian-optimizer score.

13. The media of claim 8, wherein the sample magnetic recording is smoothed according to a sampling rate of the magnetic-field map before alignment to the magnetic-field map.

14. The media of claim 8, wherein the first and second sets of parameters are generated using one or more of a non-Kalman query, a Kalman filter, or Bayesian optimization with Gaussian processes.

15. A system comprising:
one or more processors; and
one or more computer-readable non-transitory storage media coupled to one or more of the processors and comprising instructions operable when executed by one or more of the processors to cause the system to:
access a magnetic-field map of a region comprising data that represents magnetic-field values that correspond to locations in the region;
access a sample magnetic recording comprising data that represents a time or distance series of magnetic measurements made along a path in the region;
at least approximately align the sample magnetic recording to the magnetic-field map;
based on the alignment:
generate a first set of parameters for aligning subsequent magnetic recordings to the magnetic-field map across a substantial entirety of the magnetic-field map; and

generate one or more second sets of parameters for aligning subsequent magnetic recordings to the magnetic-field map in one or more subdivisions of the magnetic-field map, wherein each of the second sets of parameters corresponds to one of the subdivisions;

associate the first and second sets of parameters with the magnetic-field map; and provide the magnetic-field map with the first and second sets of parameters associated with it for subsequent navigation.

16. The system of claim 15, wherein the region is one-dimensional, two-dimensional, or three-dimensional.

17. The system of claim 15, wherein the magnetic recording is at least approximately aligned to the magnetic-field map using one or more of dynamic time warping (DTW), correlated optimized warping (COW), derivative dynamic time warping (DDTW), weighted dynamic time warping (WDTW), soft dynamic time warping (soft-DTW), global alignment kernel (GAK), edit distance with real penalty (ERP), longest common subsequence (LCSS), time-warp edit distance (TWED), or particle filtering.

18. The system of claim 15, wherein the first and second sets of parameters are for aligning the subsequent magnetic recordings to the magnetic-field map using one or more of dynamic time warping (DTW), correlated optimized warping (COW), derivative dynamic time warping (DDTW), weighted dynamic time warping (WDTW), soft dynamic time warping (soft-DTW), global alignment kernel (GAK), edit distance with real penalty (ERP), longest common subsequence (LCSS), time-warp edit distance (TWED), or particle filtering.

19. The system of claim 15, wherein the first and second sets of parameters comprise one or more of:

a distance metric;
a warping constraint;
a window constraint;
a starting-column index score;
a normalization rule;
a path constraint;
a step pattern;
an error metric;
a sampling parameter;
a runtime constraint; or
a Kalman-filter or Bayesian-optimizer score.

20. The system of claim 15, wherein the sample magnetic recording is smoothed according to a sampling rate of the magnetic-field map before alignment to the magnetic-field map.

21. The system of claim 15, wherein the first and second sets of parameters are generated using one or more of a non-Kalman query, a Kalman filter, or Bayesian optimization with Gaussian processes.

22. A system comprising:
means for accessing a magnetic-field map of a region comprising data that represents magnetic-field values that correspond to locations in the region;

means for accessing a sample magnetic recording comprising data that represents a time or distance series of magnetic measurements made along a path in the region;

means for at least approximately aligning the sample magnetic recording to the magnetic-field map;

means for, based on the alignment:

generating a first set of parameters for aligning subsequent magnetic recordings to the magnetic-field map across a substantial entirety of the magnetic-field map; and generating one or more second sets of parameters for aligning subsequent magnetic recordings to the magnetic-field map in one or more subdivisions of the magnetic-field map, wherein each of the second sets of parameters corresponds to one of the subdivisions;

means for associating the first and second sets of parameters with the magnetic-field map; and means for providing the magnetic-field map with the first and second sets of parameters associated with it for subsequent navigation.

\* \* \* \* \*